United States Patent
Ise

(10) Patent No.: US 9,210,333 B2
(45) Date of Patent: Dec. 8, 2015

(54) IMAGE CAPTURING APPARATUS FOR GENERATING COMPOSITE IMAGE AND CONTROL METHOD THEREOF

(71) Applicant: CANON KABUSHIKI KAISHA, Tokyo (JP)

(72) Inventor: Makoto Ise, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 13/902,337

(22) Filed: May 24, 2013

(65) Prior Publication Data

US 2013/0329090 A1 Dec. 12, 2013

(30) Foreign Application Priority Data

Jun. 8, 2012 (JP) .................................. 2012-131387
Feb. 25, 2013 (JP) .................................. 2013-035155

(51) Int. Cl.
H04N 5/262 (2006.01)
H04N 5/235 (2006.01)
H04N 5/232 (2006.01)
H04N 5/238 (2006.01)

(52) U.S. Cl.
CPC ......... *H04N 5/2355* (2013.01); *H04N 5/23296* (2013.01); *H04N 5/2621* (2013.01)

(58) Field of Classification Search
USPC .............. 348/240.99, 240.1–240.3, 297, 239, 348/364
See application file for complete search history.

(56) References Cited

U.S. PATENT DOCUMENTS

| 7,679,657 | B2 * | 3/2010 | Morita | 348/240.2 |
| 7,952,612 | B2 * | 5/2011 | Kakkori | 348/208.6 |
| 8,179,472 | B2 * | 5/2012 | Asoma | 348/362 |
| 8,792,019 | B2 * | 7/2014 | Yuyama | 348/239 |
| 8,866,927 | B2 * | 10/2014 | Levoy et al. | 348/222.1 |
| 2002/0145667 | A1 * | 10/2002 | Horiuchi | 348/207.99 |
| 2003/0214600 | A1 * | 11/2003 | Kido | 348/362 |
| 2009/0086085 | A1 * | 4/2009 | Asoma | 348/362 |
| 2012/0274801 | A1 * | 11/2012 | Oyachi | 348/222.1 |
| 2013/0286254 | A1 * | 10/2013 | Watanabe | 348/239 |
| 2013/0343732 | A1 * | 12/2013 | Suzuki | 386/353 |

FOREIGN PATENT DOCUMENTS

JP 07-097841 B 10/1995

* cited by examiner

*Primary Examiner* — Ngoc-Yen Vu
(74) *Attorney, Agent, or Firm* — Cowan, Liebowitz & Latman, P.C.

(57) ABSTRACT

An image capturing apparatus comprising an image capturing unit is provided. A zoom control unit controls a zoom ratio during shooting. An image capture control unit controls the image capturing unit such that a plurality of images with different exposure conditions are captured in a predetermined period. A generation output unit generates a composite image from the plurality of images and outputs the generated composite image. A determination determines whether or not the zoom ratio is being changed during the predetermined period. In a case where it is determined that the zoom ratio is being changed, the generation output unit outputs one of the images captured by the image capturing unit during the predetermined period, instead of the composite image.

9 Claims, 19 Drawing Sheets

FIG. 4

IMAGE COMPOSITING CONTROL TABLE

| OPTICAL ZOOM STATUS FLAG FLG | 0 | 1 | |
|---|---|---|---|
| ZOOM SPEED s | Don't care | s<s0 | s0≤s |
| DETERMINATION SIGNAL | Lo | Lo | Hi |
| OUTPUT IMAGE | HDR COMPOSITE IMAGE (LH) | HDR COMPOSITE IMAGE (LH) | NON-COMPOSITE IMAGE (ONLY L) |

FIG. 8

IMAGE COMPOSITING CONTROL TABLE

| OPTICAL ZOOM STATUS FLAG FLG | 0 | | 1 | |
|---|---|---|---|---|
| ZOOM SPEED s | Don't care | s<s1 | s1≤s<s2 | s2≤s |
| DETERMINATION SIGNAL 1 | Lo | Lo | Hi | Hi |
| DETERMINATION SIGNAL 2 | Lo | Lo | Lo | Hi |
| OUTPUT IMAGE | HDR COMPOSITE IMAGE (LMH) | HDR COMPOSITE IMAGE (LMH) | HDR COMPOSITE IMAGE (LM) | NON-COMPOSITE IMAGE (ONLY L) |

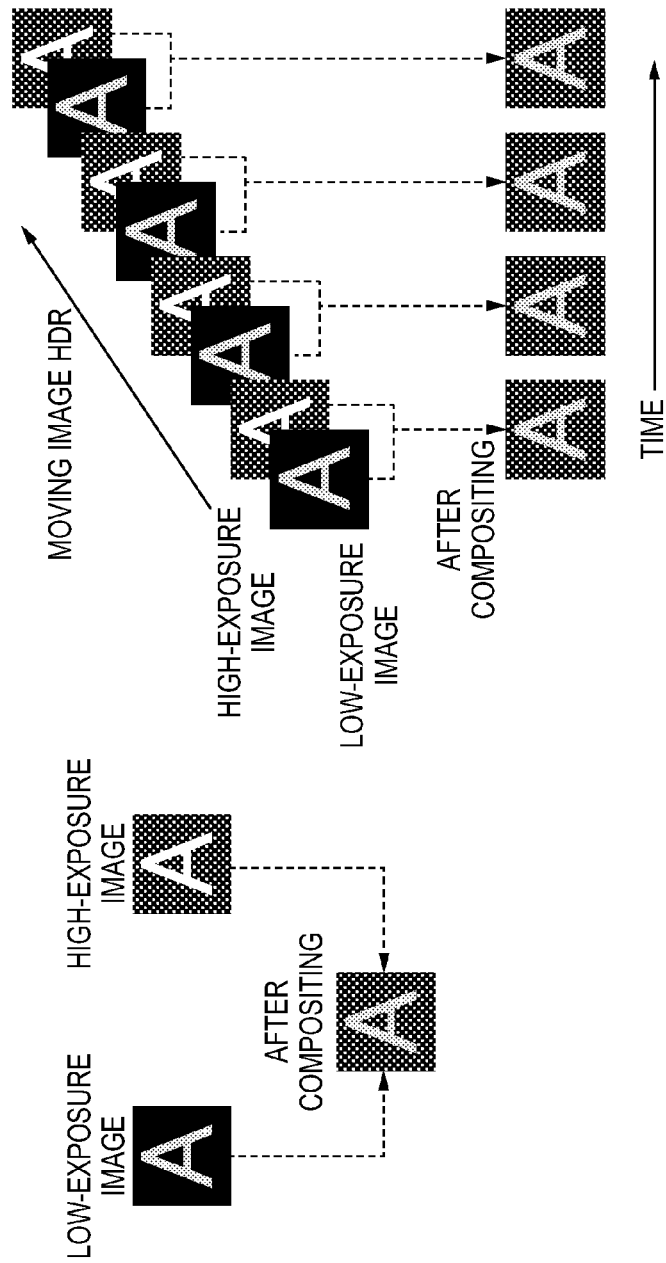

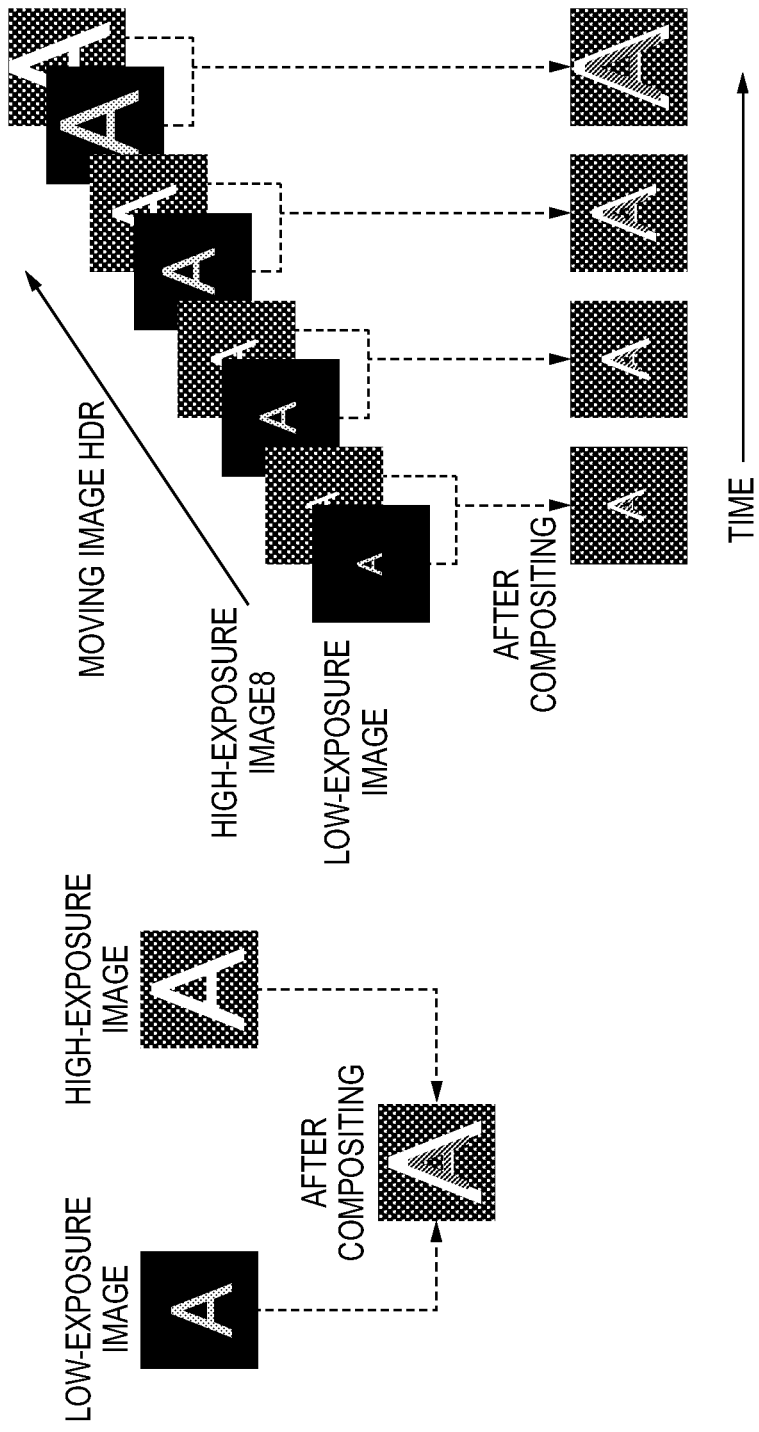

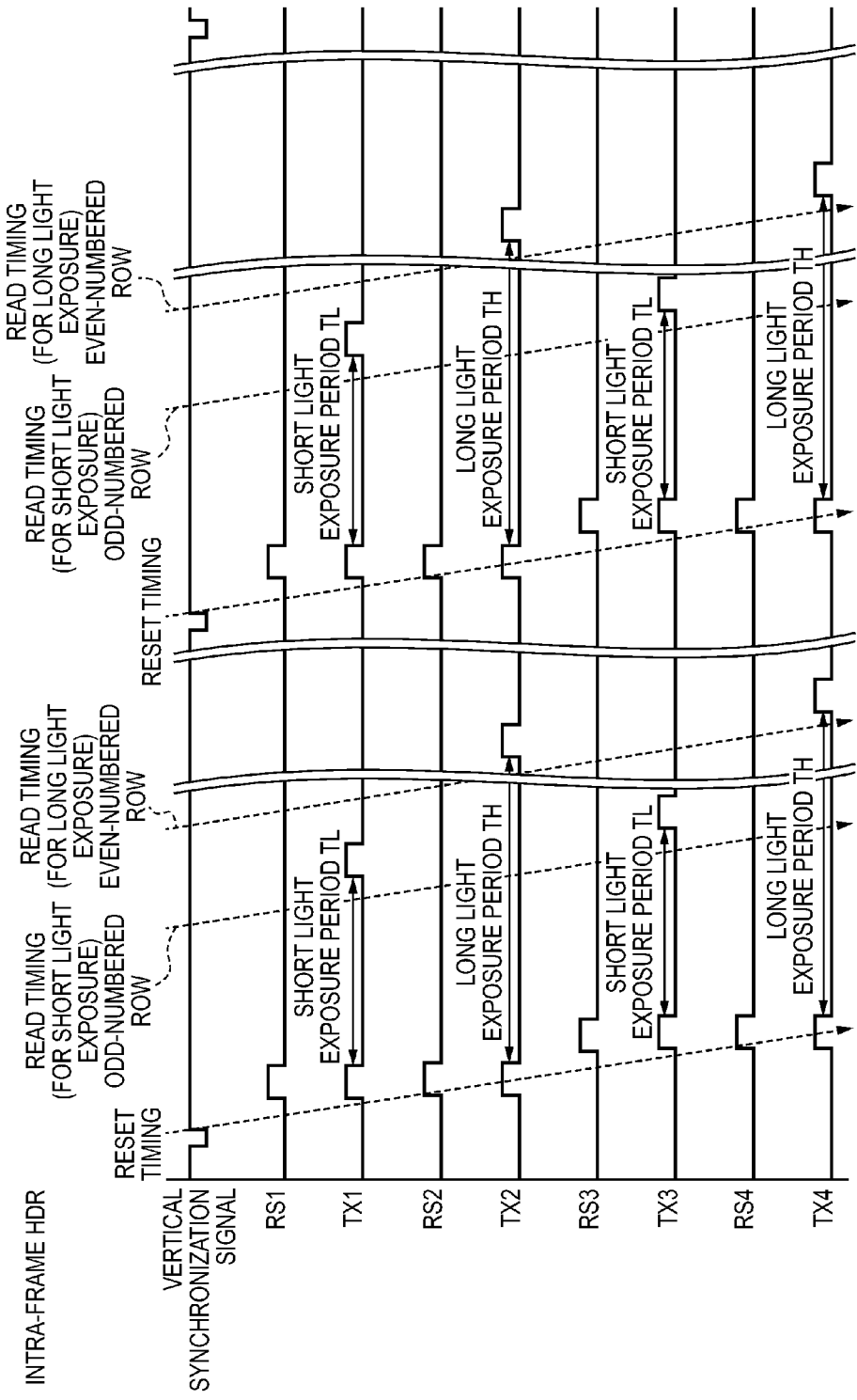

F I G. 15

IMAGE COMPOSITING CONTROL TABLE

| OPTICAL ZOOM STATUS FLAG FLG | 0 | | 1 | |
|---|---|---|---|---|
| ZOOM SPEED s | Don't care | | $s < s0$ | $s0 \leq s$ |
| DETERMINATION SIGNAL | Lo | | Lo | Hi |
| OUTPUT IMAGE | INTER-FRAME HDR COMPOSITE IMAGE | | INTER-FRAME HDR COMPOSITE IMAGE | INTRA-FRAME HDR COMPOSITE IMAGE |

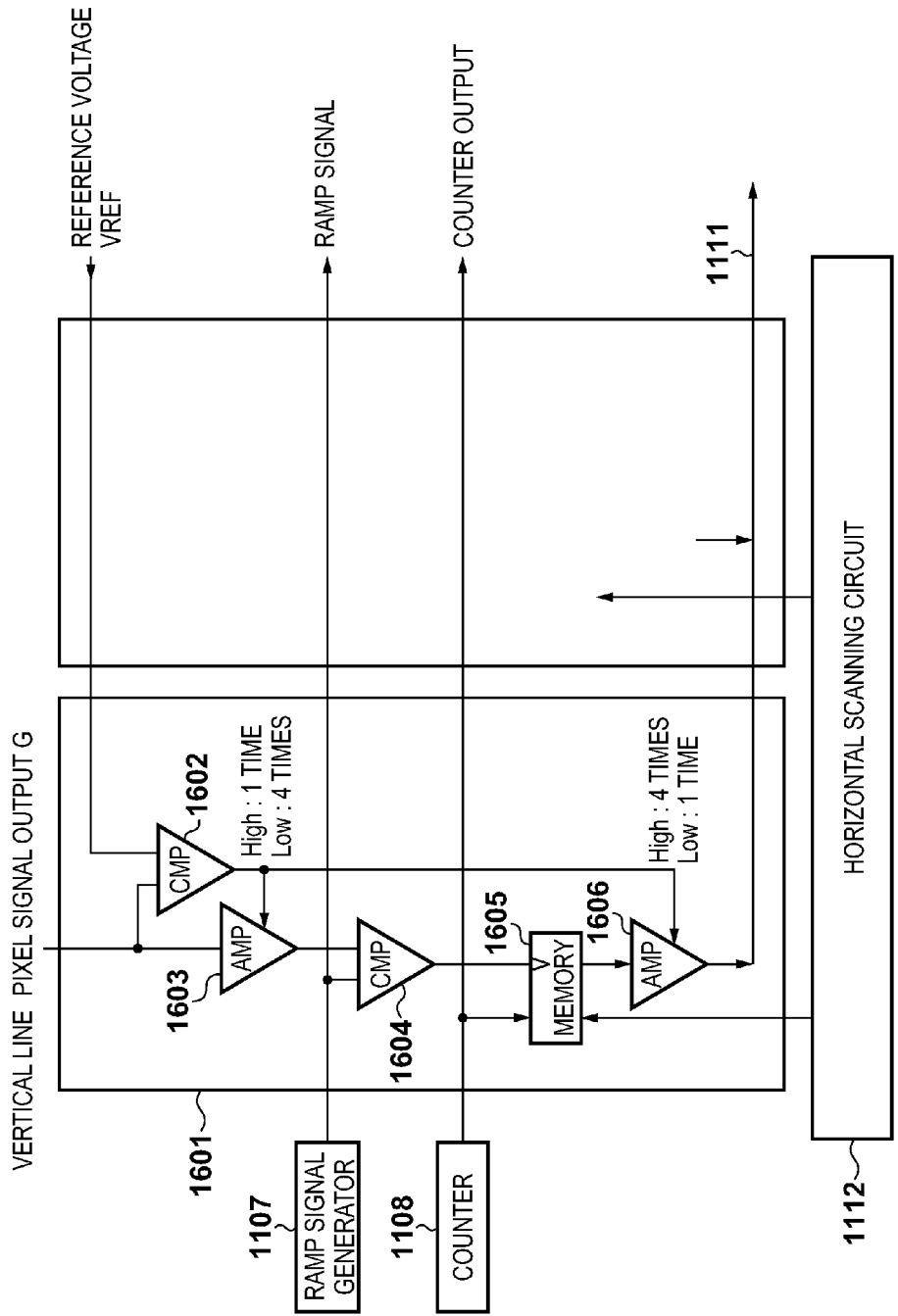

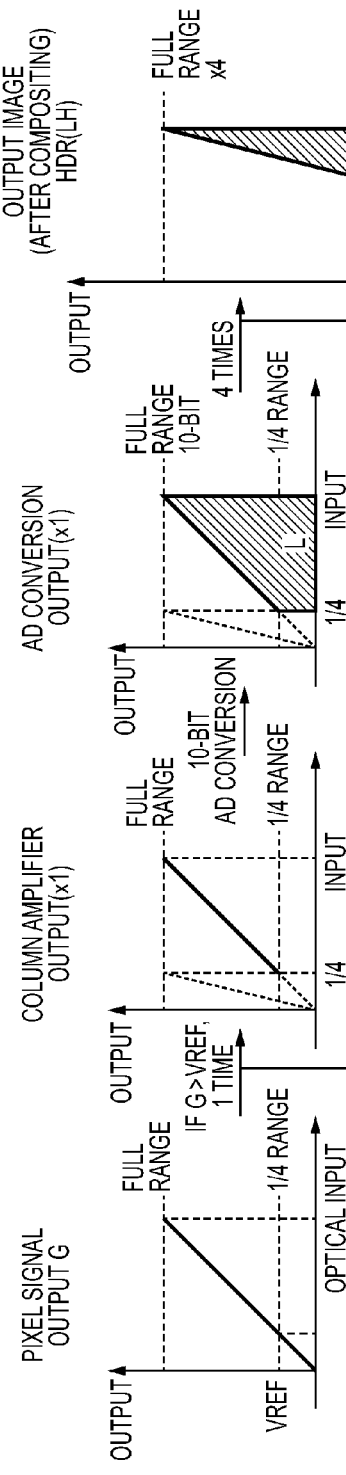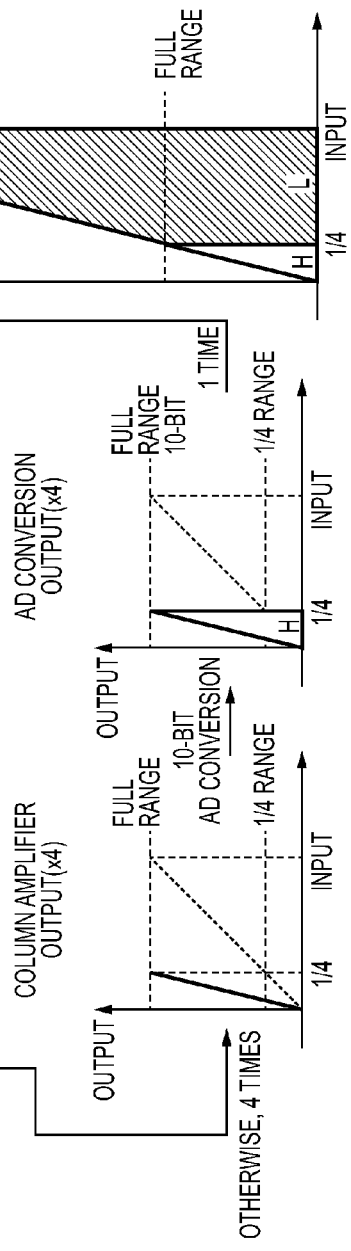

IMAGE CAPTURING APPARATUS FOR GENERATING COMPOSITE IMAGE AND CONTROL METHOD THEREOF

BACKGROUND OF THE INVENTION

1. Field of the Invention

The present invention relates to an image capturing apparatus and a control method thereof.

2. Description of the Related Art

As an apparatus for generating an image, there is a digital camera employing a commonly used image sensor such as a CMOS, a CCD, or the like. However, a commonly used image sensor such as a CMOS, a CCD, or the like has a dynamic range that is as narrow as at most approximately 50 to 70 decibels. Thus, it is difficult for such a digital camera to generate an image that expresses the brightness as seen by the human eye. For example, when an image of a landscape having great contrast is shot with such a digital camera, blocked-up shadows in dark portions and blown-out highlights in bright portions occur.

Japanese Patent Publication No. 7-97841 discloses an exemplary technique for solving this problem. According to the technique disclosed in Japanese Patent Publication No. 7-97841, proper-exposure portions are respectively extracted from an image (low-exposure image) that is overall darker than an image with proper exposure (proper brightness) and an image (high-exposure image) that is overall brighter. Then, the extracted proper-exposure portions are composited, so that an image having a high dynamic range is obtained. This sort of technique is referred to as high dynamic range (HDR) image compositing or the like.

FIG. 10A is a diagram schematically illustrating an HDR image compositing mode. This diagram shows a state in which, with HDR image compositing, blocked-up shadows in a background dark portion and blown-out highlights in a highlight portion (the letter A portion) are suppressed. Furthermore, during moving image shooting, this HDR image compositing is successively repeated as shown in FIG. 10B. When HDR image compositing is performed as shown in FIGS. 10A and 10B, it is possible to finally obtain an image that is closer to what is seen by the human eye than an original image (each image obtained during shooting) is.

Recently, optical zoom lenses are widely used in many image capturing apparatuses including video cameras. During moving image shooting with such an image capturing apparatus while performing HDR image compositing, if a zoom operation using an optical zoom lens is performed, a low-exposure image and a high-exposure image have different angles of view as shown in FIG. 10C. As a result, a problem as shown in FIG. 10D occurs in which a difference appears during a zoom operation between the angles of view of images that are to be composited, and the composite image that is to be output becomes blurred. This problem is apparent particularly when the zoom speed is high.

Thus, some of conventional image capturing apparatuses limit the zoom speed within a range in which image blur is not apparent, during moving image shooting while performing HDR image compositing. Accordingly, with conventional image capturing apparatuses, it is impossible to achieve both image blur suppression and high-speed zoom operation during a zoom operation.

SUMMARY OF THE INVENTION

The present invention was made in view of these circumstances, and provides a technique for suppressing image blur in an image that is to be output, without limiting the zoom speed, when performing a zoom operation during moving image shooting with an image capturing apparatus while performing image compositing.

According to a first aspect of the present invention, there is provided an image capturing apparatus, comprising; an image capturing unit configured to capture an image of a subject; a zoom control unit configured to control a zoom ratio during shooting; an image capture control unit configured to control the image capturing unit such that a plurality of images with different exposure conditions are captured in a predetermined period; a generation output unit configured to generate a composite image from the plurality of images and output the generated composite image; and a determination unit configured to determine whether or not the zoom ratio is being changed during the predetermined period; wherein, in a case where it is determined that the zoom ratio is being changed, the generation output unit outputs one of the images captured by the image capturing unit during the predetermined period, instead of the composite image.

According to a second aspect of the present invention, there is provided an image capturing apparatus, comprising; an image capturing unit configured to capture an image of a subject; a zoom control unit configured to control a zoom ratio during shooting; an image capture control unit configured to control the image capturing unit such that a plurality of images with different exposure conditions are captured in a predetermined period; a generation output unit configured to generate a composite image from the plurality of images and output the generated composite image; and a determination unit configured to determine whether or not the zoom ratio is being changed during the predetermined period; wherein, in a case where it is determined that the zoom ratio is being changed, the generation output unit generates a composite image from images that are captured by the image capturing unit in a period that is shorter than the predetermined period and that are fewer than the plurality of images from which the composite image is generated in a case where the zoom ratio is not being changed, and outputs the generated composite image.

According to a third aspect of the present invention, there is provided an image capturing apparatus, comprising; an image capturing unit configured to capture an image of a subject; a zoom control unit configured to control a zoom ratio during shooting; an image capture control unit configured to control the image capturing unit such that a plurality of images with different exposure conditions are captured in a predetermined period; a generation output unit configured to generate a composite image from the plurality of images and output the generated composite image; and a determination unit configured to determine whether or not the zoom ratio is being changed during the predetermined period; wherein, in a case where it is determined that the zoom ratio is being changed, the generation output unit generates a composite image from a smaller number of images as the zoom ratio is changed at higher speed, and outputs the generated composite image.

According to a fourth aspect of the present invention, there is provided an image capturing apparatus, comprising: an image capturing unit configured to capture an image of a subject; a zoom control unit configured to control a zoom ratio of the image captured by the image capturing unit; an image capture control unit configured to control the image capturing unit such that a plurality of images with different exposure amounts are generated, by operating either in a first control mode in which the image capturing unit is caused to perform image capture a plurality of times with different exposure periods, so that the plurality of images are generated, or in a second control mode in which pixels of the image capturing unit are divided into a plurality of groups, and the image capturing unit is caused to perform image capture with exposure periods different on a group basis, so that the plurality of images are generated; a generation output unit configured to generate a composite image from the plurality of images and output the generated composite image; and a determination unit configured to determine whether or not the zoom ratio is being changed; wherein, in a case where it is determined that the zoom ratio is being changed, the image capture control unit operates in the second control mode.

According to a fifth aspect of the present invention, there is provided an image capturing apparatus, comprising: an image capturing unit configured to capture an image of a subject; a zoom control unit configured to control a zoom ratio of the image captured by the image capturing unit; an image capture control unit configured to control the image capturing unit, by operating either in a first control mode in which the image capturing unit is caused to perform image capture a plurality of times with different exposure periods, so that a plurality of images with different exposure amounts are generated, or in a second control mode in which the image capturing unit is caused to generate an analog image signal through exposure for a predetermined period, and, in the analog image signal, a pixel having a signal level of lower than a threshold is multiplied by a gain larger than that for a pixel having a signal level of not lower than the threshold, so that an image with an expanded dynamic range is generated; a generation output unit configured to, in a case where the image capture control unit operates in the first control mode, generate a composite image from the plurality of images and output the generated composite image, and, in a case where the image capture control unit operates in the second control mode, output the image with an expanded dynamic range; and a determination unit configured to determine whether or not the zoom ratio is being changed; wherein, in a case where it is determined that the zoom ratio is being changed, the image capture control unit operates in the second control mode.

According to a sixth aspect of the present invention, there is provided a method for controlling an image capturing apparatus including an image capturing unit configured to capture an image of a subject, comprising; a zoom control step of controlling a zoom ratio during shooting; an image capture control step of controlling the image capturing unit such that a plurality of images with different exposure conditions are captured in a predetermined period; a generation output step of generating a composite image from the plurality of images and outputting the generated composite image; and a determination step of determining whether or not the zoom ratio is being changed during the predetermined period; wherein, in a case where it is determined that the zoom ratio is being changed, in the generation output step, one of the images captured by the image capturing unit during the predetermined period is output instead of the composite image.

According to a seventh aspect of the present invention, there is provided a method for controlling an image capturing apparatus including an image capturing unit configured to capture an image of a subject, comprising; a zoom control step of controlling a zoom ratio during shooting; an image capture control step of controlling the image capturing unit such that a plurality of images with different exposure conditions are captured in a predetermined period; a generation output step of generating a composite image from the plurality of images and outputting the generated composite image; and a determination step of determining whether or not the zoom ratio is being changed during the predetermined period; wherein, in a case where it is determined that the zoom ratio is being changed, in the generation output step, a composite image is generated from images that are captured by the image capturing unit in a period that is shorter than the predetermined period and that are fewer than the plurality of images from which the composite image is generated in a case where the zoom ratio is not being changed, and the generated composite image is output.

According to an eighth aspect of the present invention, there is provided a method for controlling an image capturing apparatus including an image capturing unit configured to capture an image of a subject, comprising; a zoom control step of controlling a zoom ratio during shooting; an image capture control step of controlling the image capturing unit such that a plurality of images with different exposure conditions are captured in a predetermined period; a generation output step of generating a composite image from the plurality of images and outputting the generated composite image; and a determination step of determining whether or not the zoom ratio is being changed during the predetermined period; wherein, in a case where it is determined that the zoom ratio is being changed, in the generation output step, a composite image is generated from a smaller number of images as the zoom ratio is changed at higher speed, and the generated composite image is output.

According to an ninth aspect of the present invention, there is provided a method for controlling an image capturing apparatus including an image capturing unit configured to capture an image of a subject, comprising: a zoom control step of controlling a zoom ratio of the image captured by the image capturing unit; an image capture control step of controlling the image capturing unit such that a plurality of images with different exposure amounts are generated, by operating either in a first control mode in which the image capturing unit is caused to perform image capture a plurality of times with different exposure periods, so that the plurality of images are generated, or in a second control mode in which pixels of the image capturing unit are divided into a plurality of groups, and the image capturing unit is caused to perform image capture with exposure periods different on a group basis, so that the plurality of images are generated; a generation output step of generating a composite image from the plurality of images and outputting the generated composite image; and a determination step of determining whether or not the zoom ratio is being changed; wherein, in a case where it is determined that the zoom ratio is being changed, the operation in the image capture control step is performed in the second control mode.

According to an tenth aspect of the present invention, there is provided a method for controlling an image capturing apparatus including an image capturing unit configured to capture an image of a subject, comprising: a zoom control step of controlling a zoom ratio of the image captured by the image capturing unit; an image capture control step of controlling the image capturing unit, by operating either in a first control mode in which the image capturing unit is caused to perform image capture a plurality of times with different exposure periods, so that a plurality of images with different exposure amounts are generated, or in a second control mode in which the image capturing unit is caused to generate an analog image signal through exposure for a predetermined period, and, in the analog image signal, a pixel having a signal level of lower than a threshold is multiplied by a gain larger than that for a pixel having a signal level of not lower than the threshold, so that an image with an expanded dynamic range is generated; a generation output step of, in a case where the operation in the image capture control step is performed in the first control mode, generating a composite image from the plurality of images and outputting the generated composite image, and, in a case where the operation in the image capture control step is performed in the second control mode, outputting the image with an expanded dynamic range; and a determination step of determining whether or not the zoom ratio is being changed; wherein, in a case where it is determined that the zoom ratio is being changed, the operation in the image capture control step is performed in the second control mode.

With the above-described configuration, according to the present invention, it is possible to suppress image blur in an image that is to be output, without limiting the zoom speed, when performing a zoom operation during moving image shooting with an image capturing apparatus while performing image compositing.

Further features of the present invention will become apparent from the following description of exemplary embodiments with reference to the attached drawings.

BRIEF DESCRIPTION OF THE DRAWINGS

FIG. 4 is an image compositing control table defining branching in image compositing control based on an optical zoom status flag and a zoom speed value according to the first embodiment.

FIG. 8 is an image compositing control table defining branching in image compositing control based on an optical zoom status flag and a zoom speed value according to the second embodiment.

FIG. 10A is a diagram schematically illustrating an HDR image compositing mode.

FIG. 10B is a diagram schematically illustrating an HDR image compositing mode during moving image shooting.

FIG. 10C is a diagram schematically illustrating an HDR image compositing mode during a zoom operation.

FIG. 10D is a diagram schematically illustrating an HDR image compositing mode at the time of a zoom operation during moving image shooting.

FIG. 13B is a timing chart of scan signals generated from the vertical scanning circuit 1100 during an intra-frame HDR operation.

FIG. 15 is an image compositing control table defining branching in image compositing control based on an optical zoom status flag and a zoom speed value according to the third embodiment.

FIG. 16 is a block diagram showing the configuration of a column A/D conversion unit 1601 of the image sensor 120 according to a fourth embodiment.

FIGS. 17A to 17F are diagrams schematically illustrating intra-frame HDR processing according to the fourth embodiment.

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

First Embodiment

Figure 1:
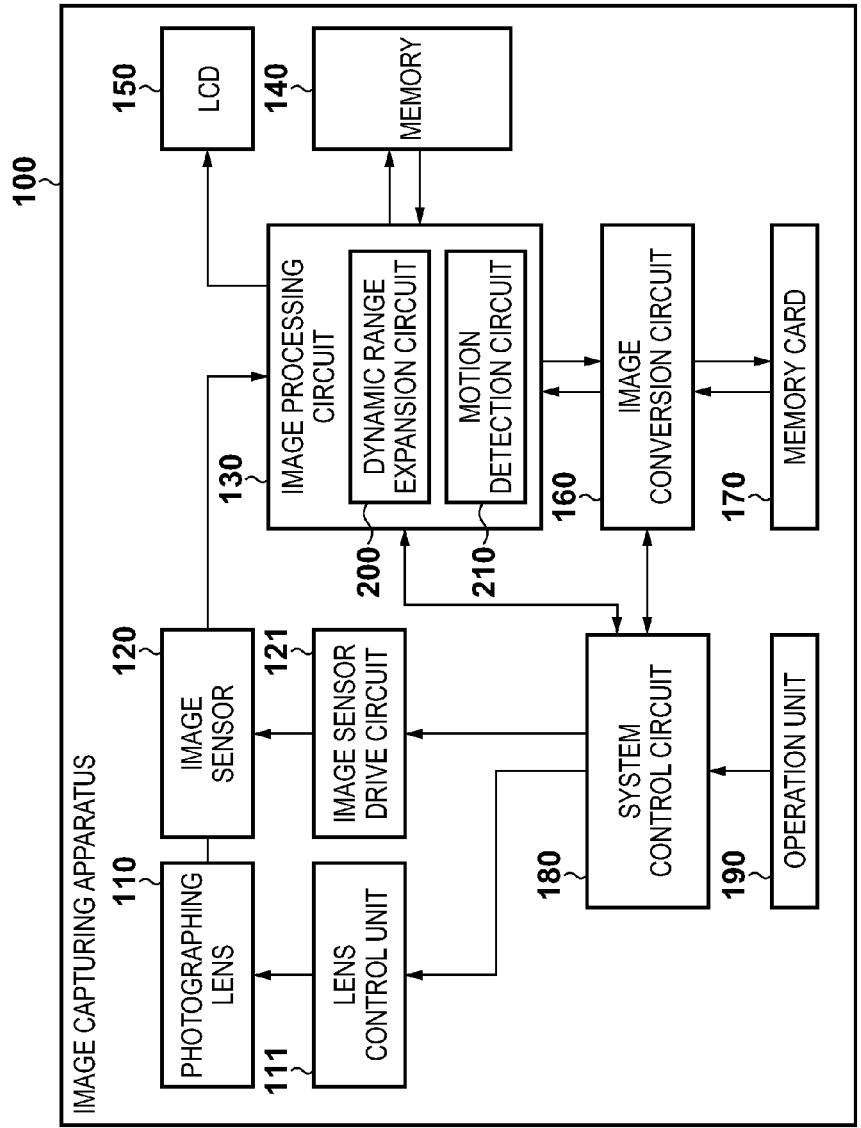
FIG. 1 is a block diagram showing the schematic configuration of an image capturing apparatus 100 according to a first embodiment.

FIG. 1 is a block diagram showing the schematic configuration of an image capturing apparatus 100 according to the first embodiment. In FIG. 1, a photographing lens 110 is configured by a group of a plurality of lenses such as a focus lens and a zoom lens, a diaphragm mechanism, and the like. A lens control unit 111 controls the focus, the zoom, and the diaphragm of the photographing lens 110 based on the control by a system control circuit 180. An image sensor 120 is a CMOS sensor that generates electric charge according to the amount of incident light through photoelectric conversion, performs A/D conversion thereon, and then outputs a digital signal, where signals from all pixels can be read, and signals obtained by adding electric charge from given pixels or signals from pixels on every given rows or columns can be read.

An image sensor drive circuit 121 drives the image sensor 120 based on the control by the system control circuit 180. The exposure time, the signal amplification amount, and the like at the time of shooting with the image sensor 120 can be changed based on the control by the image sensor drive circuit 121.

An image signal output from the image sensor 120 is input to an image processing circuit 130 that includes a dynamic range expansion circuit 200. The dynamic range expansion circuit 200 has a function of generating a dynamic range expanded image using a high-exposure image and a low-exposure image that are stored in advance in a memory 140. Furthermore, a motion detection circuit 210 detects, as necessary, the amount of motion of a main subject between a frame image that is to be processed and its previous frame image, and transmits the detection result to the system control circuit 180.

The image processing circuit 130 performs various types of signal processing such as gamma processing, color signal processing, exposure correction processing, and the like on an image signal. Furthermore, the image processing circuit 130 also performs image size changing processing such as magnification and reduction according to a zoom operation (so-called electronic zoom processing). At that time, the image processing circuit 130 writes and reads an image signal into and from the memory 140. Furthermore, the output from the image processing circuit 130 may be displayed on an LCD 150.

The image data that has been processed by the image processing circuit 130 is compressed by an image conversion circuit 160 and is written into a memory card 170. The image conversion circuit 160 has a function of compressing the image data from the image processing circuit 130 and outputting the data to the memory card 170, and a function of decompressing the image data read from the memory card 170 and outputting the data to the image processing circuit 130.

The system control circuit 180 performs through-the-lens (TTL) autofocus (AF) processing, auto-exposure (AE) processing, flash pre-emission (EF) processing, and the like, using the signal that has been processed by the image processing circuit 130. Note that, as exposure conditions at the time of shooting, any condition can be computed by the system control circuit 180 from results of auto-exposure (AE) processing, conditions necessary for dynamic range expansion, and the like, and be instructed to the lens control unit 111 and the image sensor drive circuit 121.

An operation unit 190 is an operation unit that is used by a user to input an instruction to the image capturing apparatus 100, and examples thereof include a release button, a mode switching dial, a zoom operation lever, and the like. The input from the user via the operation unit 190 is notified to the system control circuit 180.

When performing a zoom operation via the operation unit 190, input from the user for instructing a zoom operation is input to the system control circuit 180. The system control circuit 180 performs zoom control according to this input from the user. The system control circuit 180 calculates a zoom ratio, an optical zoom status flag FLG indicating either optical zoom or electronic zoom, which is determined according to the zoom ratio value, and a zoom speed s. The optical zoom status flag FLG is set at "1" in the case of optical zoom, and is set at "0" in the case of electronic zoom. The system control circuit 180 temporarily stores the optical zoom status flag FLG and the zoom speed s in a parameter storage area (not shown) inside the system control circuit 180. Furthermore, the system control circuit 180 notifies the image processing circuit 130 of the electronic zoom ratio together with the optical zoom status flag FLG, as control information relating to electronic zoom.

Figure 2:
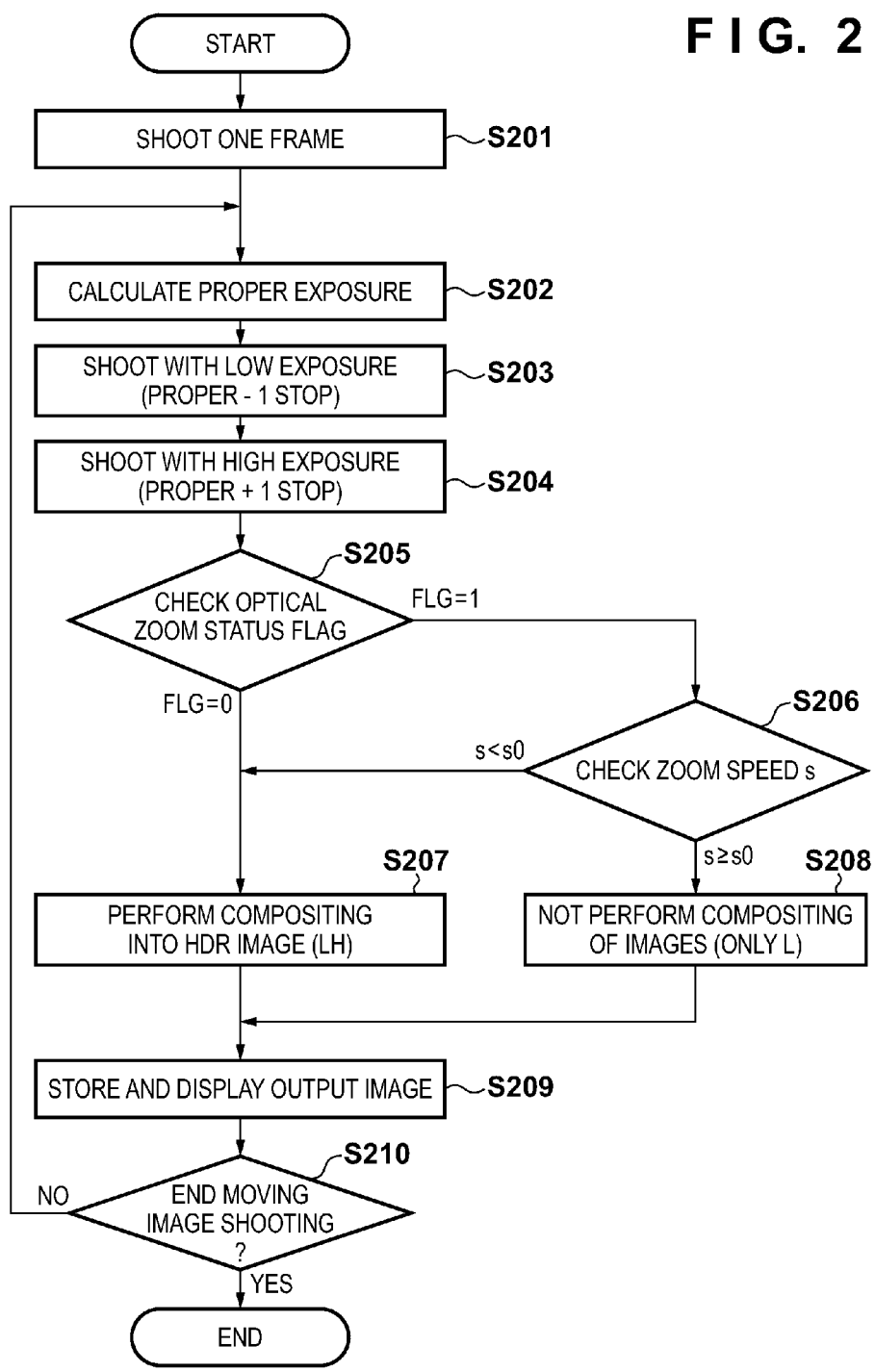
FIG. 2 is a flowchart showing a moving image shooting process according to the first embodiment.
Figure 3:
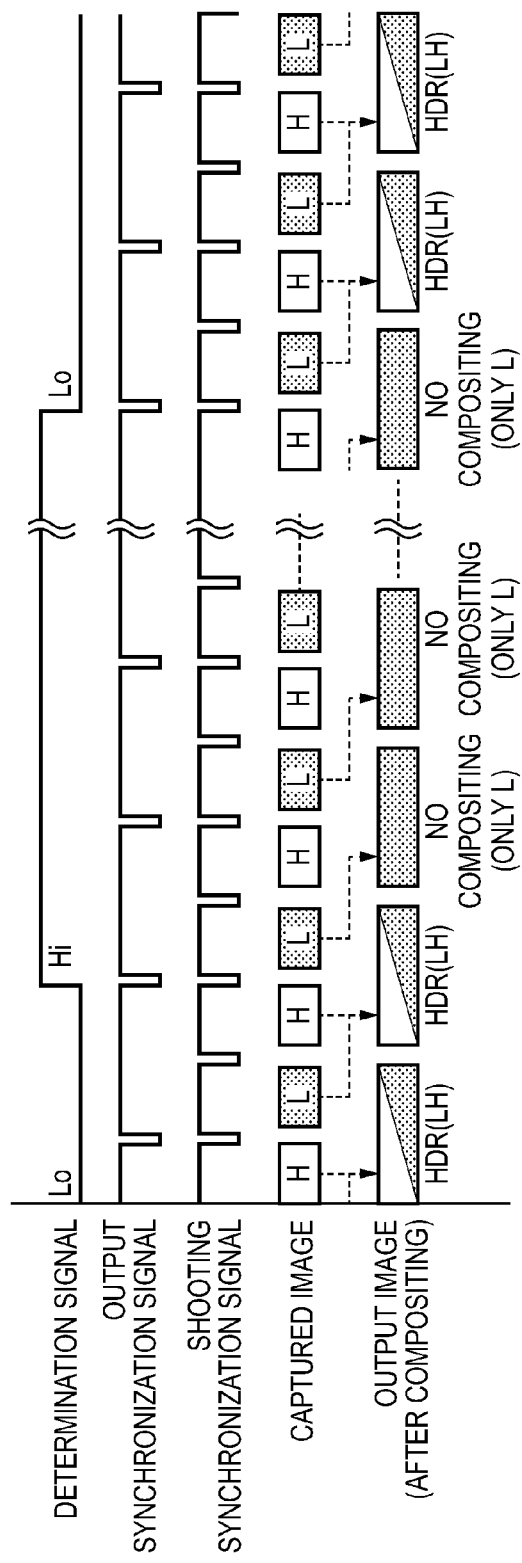
FIG. 3 is a timing chart showing drive timing of an image sensor 120 during moving image shooting according to the first embodiment.
Figure 5:
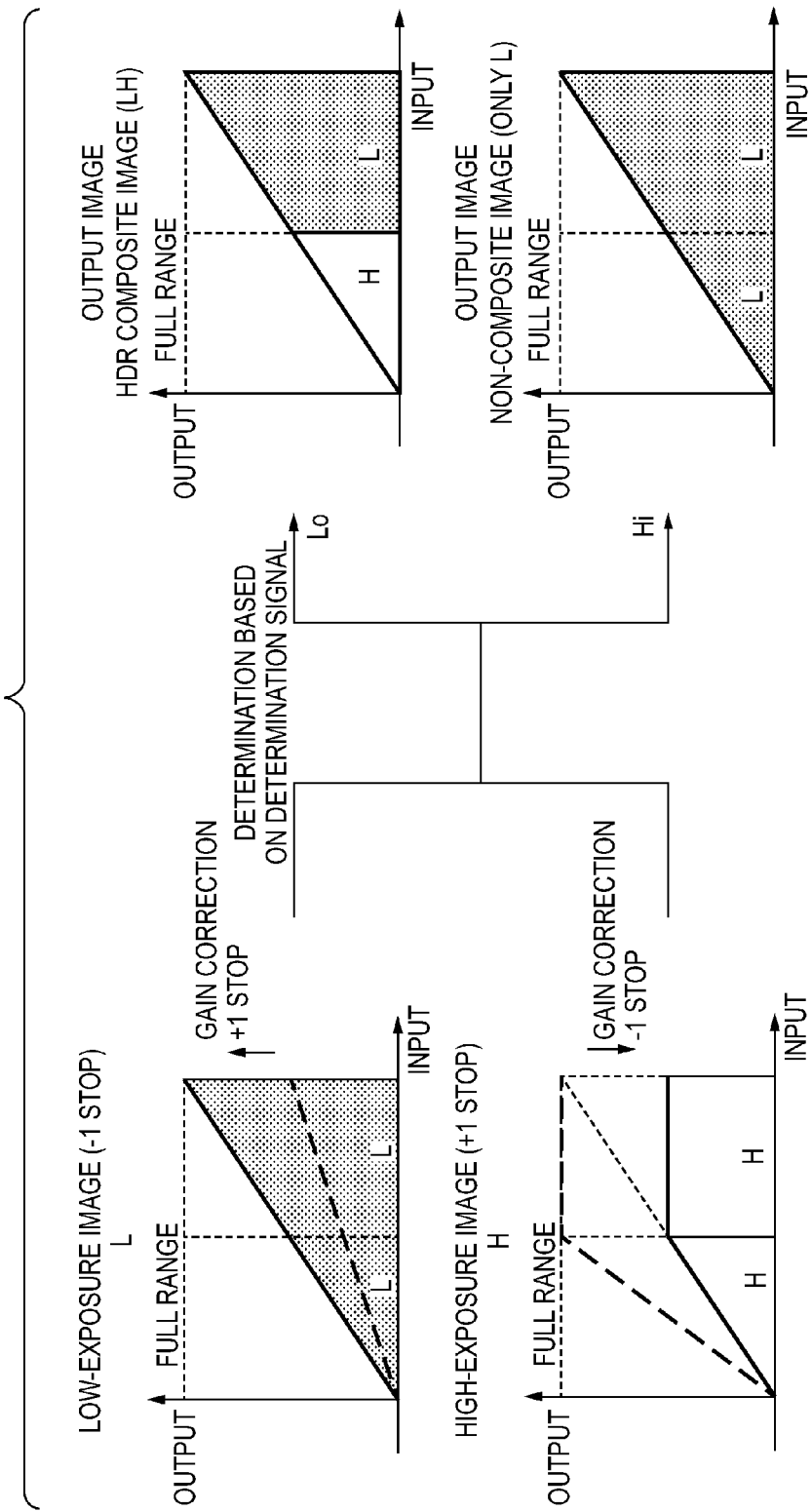
FIG. 5 is a diagram schematically illustrating a state in which image compositing control modes are switched based on a determination signal according to the first embodiment.

Subsequently, a moving image shooting process according to the first embodiment will be described with reference to FIGS. 2 to 5. FIG. 2 is a flowchart showing a moving image shooting process according to the first embodiment. FIG. 3 is a timing chart showing drive timing of the image sensor 120 during moving image shooting. FIG. 4 is an image compositing control table defining branching in image compositing control based on an optical zoom status flag and a zoom speed value. FIG. 5 is a diagram schematically illustrating a state in which image compositing control modes are switched based on a determination signal.

In the moving image shooting process of this embodiment, the image processing circuit 130 outputs, as a frame image forming a moving image, a high dynamic range (HDR) image generated from a plurality of images with different exposure amounts or an ordinary image (based on one captured image). The image processing circuit 130 switches an image that is to be output, between the HDR image and the ordinary image, based on the zoom state. In the description below, the image output by the image processing circuit 130 as a frame image may be referred to as a "composite image", an "image after compositing", or the like. Strictly speaking, the ordinary image is not an image obtained by compositing a plurality of images, but, for the sake of convenience of the description, the "ordinary image" also may be referred to as a "composite image" or the like. Accordingly, in the description below, the "composite image" may refer to an "HDR image" or may refer to an "ordinary image" depending on the context.

In FIG. 3, the determination signal is a control signal that is output by the system control circuit 180 to the image processing circuit 130. The system control circuit 180 outputs the determination signal based on the optical zoom status flag FLG and the zoom speed s. As shown in FIG. 4, if the optical zoom status flag FLG is 1, a determination signal with the logic level Lo is output when the zoom speed s is less than a predetermined threshold s0 (less than a first threshold), and a determination signal with the logic level Hi is output when the zoom speed s is the predetermined threshold s0 or more. Furthermore, if the optical zoom status flag FLG is 0, a determination signal with the logic level Lo is output regardless of the zoom speed s. The image processing circuit 130 switches the mode for an output image after compositing based on the determination signal.

The threshold s0 in the determination of the zoom speed s is set at the boundary whether or not a difference between the angles of view of two images consisting of a low-exposure image and a high-exposure image, which occurs due to a movement distance of the zoom lens, is perceivable as image blur at the time of HDR compositing.

Although not shown, when the optical zoom status flag FLG is 1, the system control circuit 180 may output a determination signal with the logic level Hi regardless of the zoom speed. Furthermore, the system control circuit 180 may determine the determination signal based not on the optical zoom status flag but on a zoom status flag that does not distinguish the optical zoom from the electronic zoom. In this case, the zoom status flag is set at "1" if a zoom operation is being performed (regardless of whether the optical zoom or the electronic zoom is used), and set at "0" if a zoom operation is not being performed.

Referring to FIG. 3 again, the output synchronization signal refers to a synchronization signal that instructs a time to output an image after compositing, and this cycle corresponds to the moving image frame rate. Furthermore, the shooting synchronization signal refers to a synchronization signal that instructs a time to acquire one image (image that is to be composited), and this cycle corresponds to the frame rate (image capture rate) in the image capture by the image sensor 120. In the example in FIG. 3, the output synchronization signal has a cycle that is twice the cycle of the shooting synchronization signal.

Furthermore, FIG. 3 shows captured images and output images after compositing in the form of a conceptual diagram illustrating a time to capture an image and a time to composite images, where low-exposure images are denoted by L, high-exposure images are denoted by H, and HDR images after compositing obtained from these images are denoted by HDR (LH).

The image processing circuit 130 (generation output unit) generates an HDR image from a low-exposure image L and a high-exposure image H and outputs the generated HDR image if the determination signal is Lo, and outputs the low-exposure image L instead of the HDR image if the determination signal is Hi.

Hereinafter, a specific example of processing that generates a composite image (image compositing control) will be described with reference to FIG. 5. FIG. 5 shows relationships between the exposure conditions and the input and output ranges of shooting signals respectively for a low-exposure image and a high-exposure image.

In order to capture a low-exposure image L, the system control circuit 180 performs an image capturing process using the range at "full range−1" stops, under a low exposure condition equivalent to underexposure by 1 stop with respect to the proper exposure. Then, the image processing circuit 130 corrects the captured image to the proper range through exposure correction processing to increase the gain by 1 stop. With the gain up at that time, on the lower side in the output range, blocked-up shadows or image quality deterioration easily occurs due to noise or deterioration in tone precision.

In order to capture a high-exposure image H, the system control circuit 180 performs an image capturing process using the range at "full range+1" stops, under a high exposure condition equivalent to overexposure by 1 stop with respect to the proper exposure. Then, the image processing circuit 130 corrects the captured image to the proper range through exposure correction processing to decrease the gain by 1 stop. At that time, the upper half of the output range corresponds to a tone region in which the subject cannot be properly reproduced due to over-range (region in which so-called blown-out highlights occur).

An HDR composite image (LH) is generated by compositing image data in the upper half of the range extracted from the low-exposure image L and image data in the lower half of the range extracted from the high-exposure image H respectively as proper-exposure portions. Note that the stop refers to a scale unit, where +1 stop corresponds to twice, and −1 stop corresponds to (½) times. Then, as a result of the determination based on the determination signal, either the non-composite image (low-exposure image L) or the HDR composite image (LH) is selected as an output image, and is output.

Next, the moving image shooting process of this embodiment will be described with reference to FIG. 2. When an instruction to start moving image shooting is input to the system control circuit 180 via a release button, a mode switching dial, or the like of the operation unit 190, a moving image shooting process is started. In the flowchart in FIG. 2, the processing in each step is realized by the system control circuit 180 executing a control program, unless otherwise described.

In step S201, the system control circuit 180 shoots one frame under a predetermined exposure condition, and stores the captured image in the memory 140. In step S202, the system control circuit 180 performs auto-exposure (AE) processing based on the captured image stored in the memory 140, thereby calculating a proper exposure condition for the subject.

In step S203, the system control circuit 180 shoots one frame under a low exposure condition equivalent to underexposure by 1 stop with respect to the proper exposure condition calculated in step S202, and stores the low-exposure image L in the memory 140. Subsequently, in step S204, the system control circuit 180 shoots one frame under a high exposure condition equivalent to overexposure by 1 stop with respect to the proper exposure condition, and stores the high-exposure image H in the memory 140.

Next, the system control circuit 180 performs the processing in steps S205 to S208 referring to the image compositing control table as shown in FIG. 4 provided inside the system control circuit 180. Specifically, in step S205, the system control circuit 180 determines whether or not the zoom ratio is being changed. For this determination, the system control circuit 180 checks the optical zoom status flag FLG. If FLG=0 (i.e., if the zoom ratio is not being changed), the procedure advances to step S207. In step S207, the system control circuit 180 outputs a determination signal with the logic level Lo to the image processing circuit 130. As a result, the image processing circuit 130 causes the dynamic range expansion circuit 200 to composite the low-exposure image L and the high-exposure image H stored in the memory 140, thereby generating an HDR composite image (LH).

On the other hand, in step S205, if FLG=1 (i.e., if the zoom ratio is being changed), the procedure advances to step S206.

In step S206, the system control circuit 180 checks the zoom speed s. If s<s0 (i.e., if the speed of a change in the zoom ratio is less than the first threshold), the procedure advances to step S207. In this case, as in the case where FLG=0 in step S205, the image processing circuit 130 generates an HDR composite image (LH).

On the other hand, in step S206, if s≥s0, the procedure advances to step S208. In step S208, the system control circuit 180 outputs a determination signal with the logic level Hi to the image processing circuit 130. As a result, the image processing circuit 130 selects the low-exposure image L instead of the HDR composite image.

After step S207 or S208, in step S209, the image processing circuit 130 performs various types of image processing on the image obtained in step S207 or S208, and outputs this image to the LCD 150 or the image conversion circuit 160. As necessary, the image processing circuit 130 also performs electronic zoom processing. In this manner, with the processing in steps S205 to S209, the HDR composite image (LH) or the low-exposure image L is output as an image corresponding to one frame of a moving image based on the zoom operation state.

In step S210, the system control circuit 180 determines whether or not an instruction to end the moving image shooting has been input via a release button, a mode switching dial, or the like of the operation unit 190. Until an end instruction is input, the processing in steps S202 to S209 is repeated. In other words, until an end instruction is input, the system control circuit 180 repeats processing (image capture control) that captures a low-exposure image L and a high-exposure image H in a predetermined period (in a period corresponding to one output synchronization signal in FIG. 3). Then, the image processing circuit 130 outputs the HDR composite image (LH) or the low-exposure image L based on the zoom operation state.

Note that, as described above with reference to FIG. 4, when the optical zoom status flag FLG is 1, the system control circuit 180 may output a determination signal with the logic level Hi regardless of the zoom speed. In this case, the determination processing in step S206 is omitted, and, if FLG=1 in step S205, the procedure advances from step S205 to step S208. Furthermore, the system control circuit 180 may determine the determination signal based not on the optical zoom status flag but on a zoom status flag that does not distinguish the optical zoom from the electronic zoom. In this case, the system control circuit 180 considers a change in the zoom ratio in electronic zoom as well as that in optical zoom, and, if the zoom ratio is being changed, the procedure advances from step S205 to step S206.

Furthermore, in the flowchart in FIG. 2, it is assumed that the system control circuit 180 acquires two images (a low-exposure image L and a high-exposure image H) in a predetermined period. However, the number of images to be captured is not limited to 2, and three or more images with different exposure amounts may be acquired. Furthermore, it is assumed that a low-exposure image L is selected in step S208, but the image processing circuit 130 may select any other image captured in a predetermined period, as well as the low-exposure image L. For example, the image processing circuit 130 selects the low-exposure image L when giving priority to prevention of blown-out highlights, and selects the high-exposure image H when giving priority to prevention of deterioration by noise.

Furthermore, in this embodiment, for the sake of convenience of the description, it is assumed that the low exposure condition and the high exposure condition are respectively lower and higher than the proper exposure condition by 1 stop, but these conditions may be changed as appropriate.

As described above, according to this embodiment, the image capturing apparatus 100 outputs an HDR image if the zoom ratio is not being changed, and outputs an ordinary image instead of the HDR image if the zoom ratio is being changed. As a result, generation of an HDR image based on a plurality of images with different angles of view, due to a change in the zoom ratio, is suppressed.

Accordingly, it is possible to suppress image blur in an image that is to be output, without limiting the zoom speed, when performing a zoom operation during moving image shooting with an image capturing apparatus while performing HDR image compositing.

Second Embodiment

In the first embodiment, the image capturing apparatus 100 generates an HDR image from two captured images if a zoom operation is not being performed. However, as described above, the image capturing apparatus 100 may generate an HDR image from three or more captured images. Furthermore, in the first embodiment, the image capturing apparatus 100 interrupts generation of HDR images if a zoom operation is being performed at a speed of the threshold or more. However, without interrupting generation of HDR images, it is possible to reduce image blur in an HDR image by generating the HDR image from images that are fewer than the images to be used in the case where a zoom operation is not being performed.

Thus, in the second embodiment, a configuration will be described in which, if a zoom operation is not being performed, an HDR image is generated from three captured images, and, if a zoom operation is being performed, the number of images that are to be composited is reduced according to the zoom speed or generation of HDR images is interrupted. Note that the configuration of the image capturing apparatus 100 of this embodiment is similar to that of the first embodiment (see FIG. 1), and, thus, a description thereof has been omitted.

Figure 6:
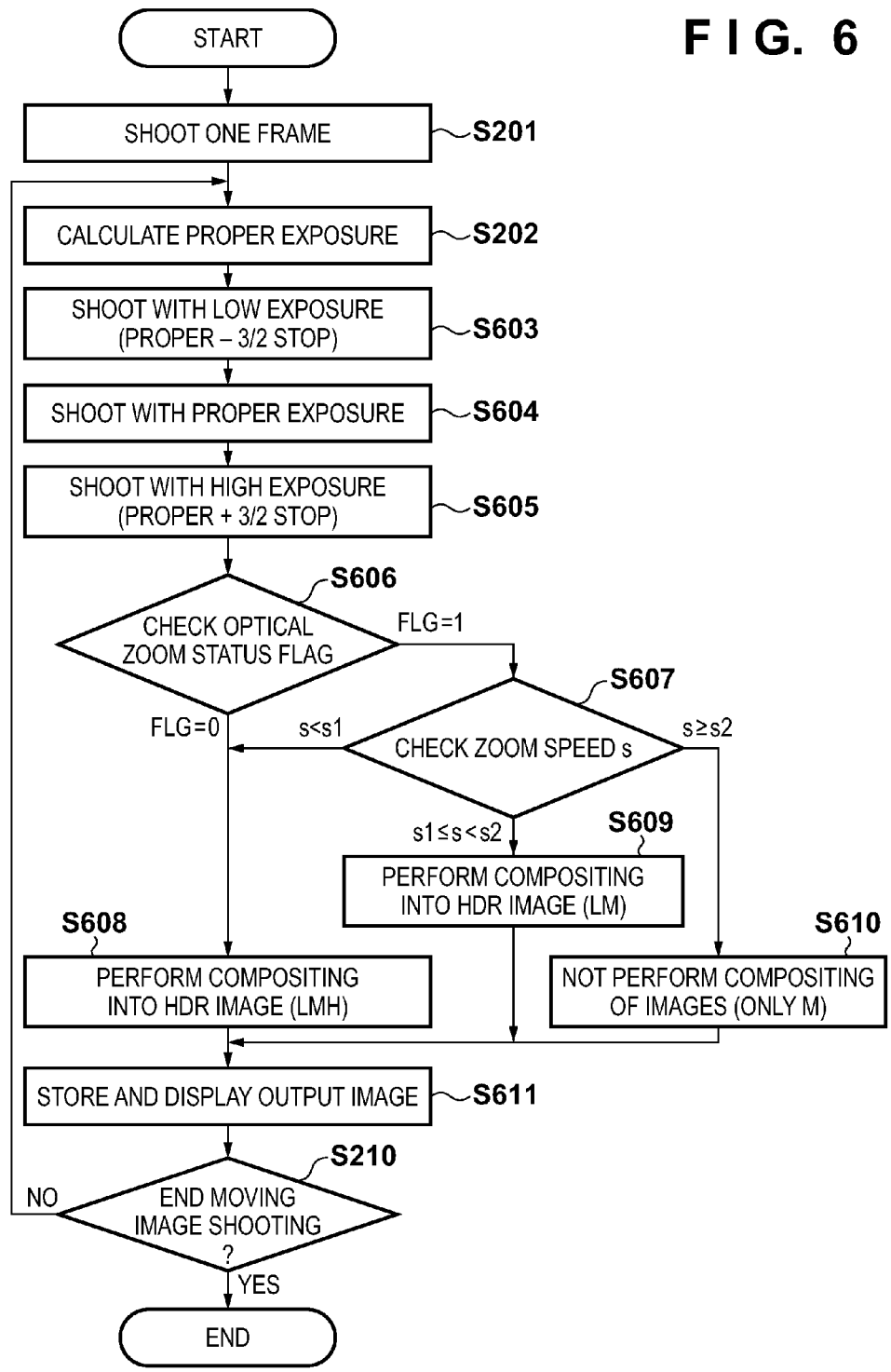
FIG. 6 is a flowchart showing a moving image shooting process according to a second embodiment.
Figure 7:
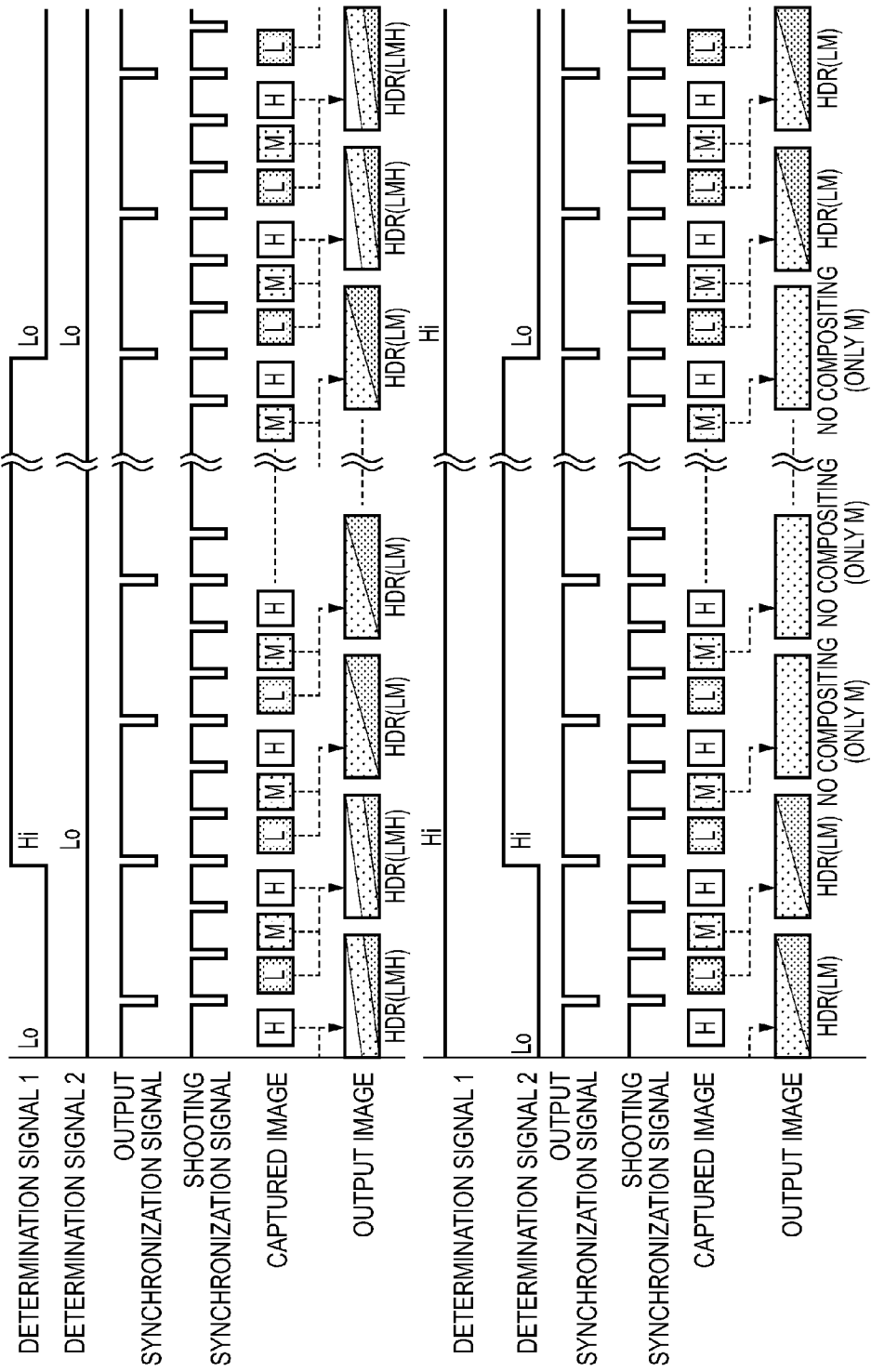
FIG. 7 is a timing chart showing drive timing of the image sensor 120 during moving image shooting according to the second embodiment.
Figure 9:
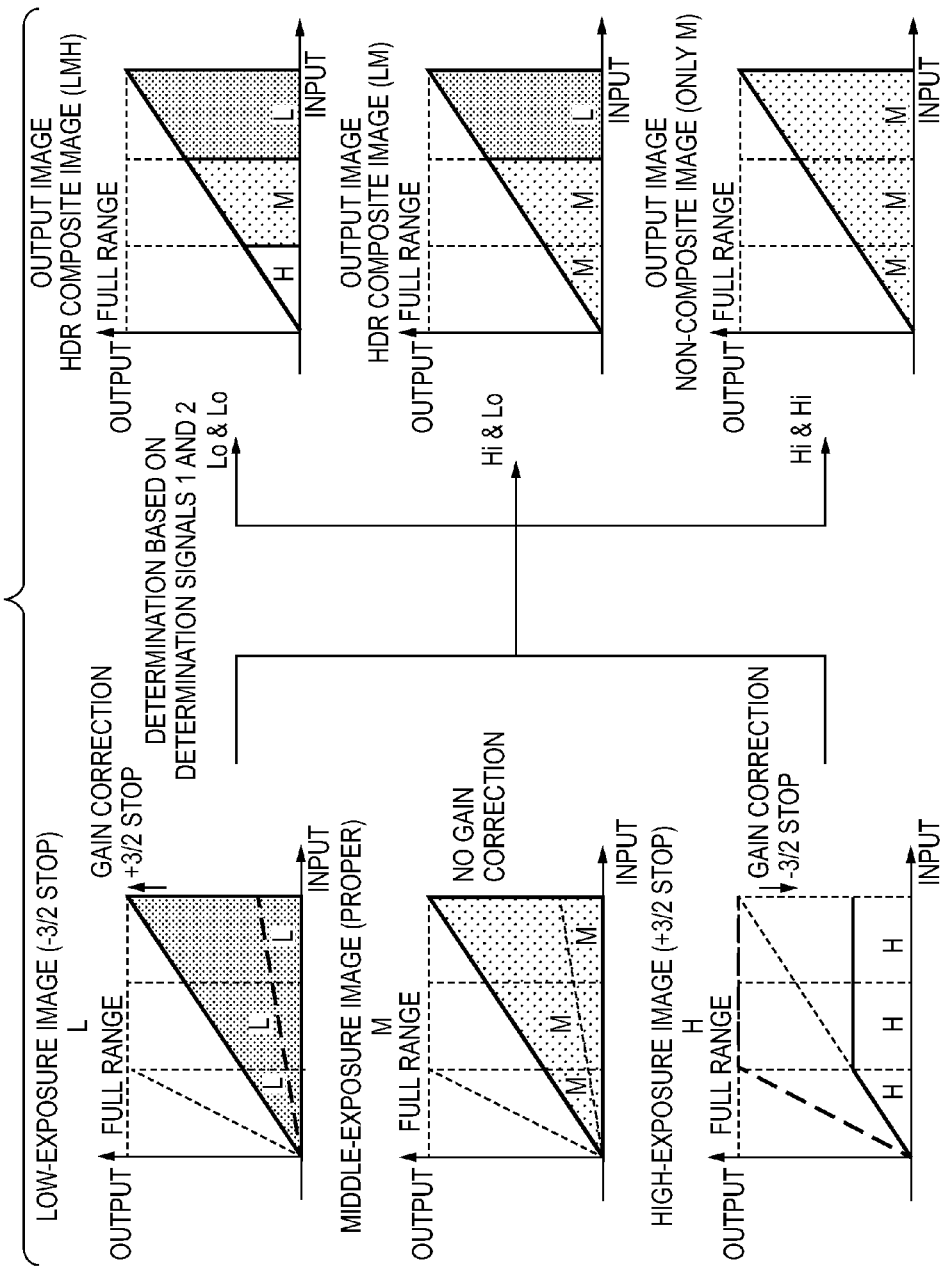
FIG. 9 is a diagram schematically illustrating a state in which image compositing control modes are switched based on determination signals according to the second embodiment.

Hereinafter, a moving image shooting process according to the second embodiment will be described with reference to FIGS. 6 to 9. FIG. 6 is a flowchart showing a moving image shooting process according to the second embodiment. FIG. 7 is a timing chart showing drive timing of the image sensor 120 during moving image shooting. FIG. 8 is an image compositing control table defining branching in image compositing control based on an optical zoom status flag and a zoom speed value. FIG. 9 is a diagram schematically illustrating a state in which image compositing control modes are switched based on determination signals.

Also in the description below of this embodiment, as in the first embodiment, the "composite image" may refer to an "HDR image" or may refer to an "ordinary image" depending on the context.

In FIG. 7, a determination signal 1 and a determination signal 2 are control signals that are output by the system control circuit 180 to the image processing circuit 130. The system control circuit 180 outputs the determination signal 1 and the determination signal 2 based on the optical zoom status flag FLG and the zoom speed s. As shown in FIG. 8, if the optical zoom status flag FLG is 1, the determination signal 1 and the determination signal 2 are output as signals with the logic level Lo when the zoom speed s is less than a first threshold s1 (less than the first threshold). Furthermore, when the zoom speed s is the first threshold s1 or more and less than a second threshold s2, the determination signal 1 is output as a signal with the logic level Hi, and the determination signal 2 is output as a signal with the logic level Lo. Furthermore, when the zoom speed s is the second threshold s2 or more (the second threshold or more), the determination signal 1 and the determination signal 2 are output as signals with the logic level Hi. Furthermore, if the optical zoom status flag FLG is 0, the determination signal 1 and the determination signal 2 are output as signals with the logic level Lo regardless of the zoom speed s. The image processing circuit 130 switches the mode for an output image after compositing based on the determination signal 1 and the determination signal 2.

The first threshold s1 in the determination of the zoom speed s is set at the boundary whether or not a difference among the angles of view of three images consisting of a low-exposure image L, a proper-exposure image M, and a high-exposure image H, which occurs due to a movement distance of the zoom lens, is perceivable as image blur at the time of HDR compositing.

Furthermore, the second threshold s2 in the determination of the zoom speed s is set at the boundary whether or not a difference between the angles of view of two images consisting of a low-exposure image L and a proper-exposure image M, which occurs due to a movement distance of the zoom lens, is perceivable as image blur at the time of HDR compositing.

Referring to FIG. 7 again, the output synchronization signal refers to a synchronization signal that instructs a time to output an image after compositing, and this cycle corresponds to the moving image frame rate. Furthermore, the shooting synchronization signal refers to a synchronization signal that instructs a time to capture one image (image that is to be composited), and this cycle corresponds to the frame rate (image capture rate) in the image capture by the image sensor 120. In the example in FIG. 7, the output synchronization signal has a cycle that is three times the cycle of the shooting synchronization signal.

Furthermore, FIG. 7 shows captured images and output images after compositing in the form of a conceptual diagram illustrating a time to capture an image and a time to composite images, where low-exposure images are denoted by L, proper-exposure images are denoted by M, high-exposure images are denoted by H, and HDR images after compositing obtained from these images are denoted by HDR (LMH).

The image processing circuit 130 (generation output unit) generates an HDR image from a low-exposure image L, a proper-exposure image M, and a high-exposure image H and outputs the generated HDR image, if the determination signal 1 and the determination signal 2 are Lo. Furthermore, the image processing circuit 130 generates an HDR image from the low-exposure image L and the proper-exposure image M and outputs the generated HDR image, if the determination signal 1 is Hi and the determination signal 2 is Lo. Furthermore, the image processing circuit 130 outputs the proper-exposure image M instead of the HDR image, if the determination signal 1 and the determination signal 2 are Hi.

The low-exposure image L and the proper-exposure image M are captured in a period that is shorter than a period (predetermined period) in which the low-exposure image L, the proper-exposure image M, and the high-exposure image H are captured. Accordingly, if an HDR image is generated from the low-exposure image L and the proper-exposure image M, the difference between the angles of view of images that are to be composited becomes lower than that in the case where an HDR image is generated from the low-exposure image L, the proper-exposure image M, and the high-exposure image H, and, thus, image blur in the HDR image is reduced.

Hereinafter, a specific example of processing that generates a composite image (image compositing control) will be described with reference to FIG. 9. FIG. 9 shows relationships between the exposure conditions and the input and output ranges of shooting signals respectively for a low-exposure image, a proper-exposure image, and a high-exposure image.

In order to capture a low-exposure image L, the system control circuit 180 performs an image capturing process using the range at "full range−(3/2)" stop, under a low exposure condition equivalent to underexposure by (3/2) stops with respect to the proper exposure. Then, the image processing circuit 130 corrects the captured image to the proper range through exposure correction processing to increase the gain by (3/2) stops. With the gain up at that time, on the lower side in the output range, blocked-up shadows or image quality deterioration easily occurs due to noise or deterioration in tone precision.

In order to capture a proper-exposure image M, the system control circuit 180 performs an image capturing process using the exactly full range, according to a proper exposure condition. Accordingly, the captured image is in the proper range without exposure correction processing, and the proper-exposure image M is obtained.

In order to capture a high-exposure image H, the system control circuit 180 performs an image capturing process using the range at "full range+(3/2)" stops, under a high exposure condition equivalent to overexposure by (3/2) with respect to the proper exposure. Then, the image processing circuit 130 corrects the captured image to the proper range through exposure correction processing to decrease the gain by (3/2) stops. At that time, the upper (3/2) stops in the output range corresponds to a tone region in which the subject cannot be properly reproduced due to over-range (region in which so-called blown-out highlights occur).

An HDR composite image (LM) is generated by compositing image data in the upper part of the range extracted from a low-exposure image L and image data in the lower part of the range and the intermediate part of the range extracted from a proper-exposure image M respectively as proper-exposure portions. Furthermore, an HDR composite image (LMH) is generated by compositing image data in the upper part of the range extracted from a low-exposure image L, image data in the intermediate part of the range extracted from a proper-exposure image M, and image data in the lower part of the range extracted from a high-exposure image H respectively as proper-exposure portions. Note that the stop refers to a scale unit, where (3/2) stops correspond to (2√2) times, and −(3/2) stops correspond to (½√2) times.

Then, as a result of the determination based on the determination signal 1 and the determination signal 2, either the non-composite image (proper-exposure image M) or the HDR composite image (LH) or the HDR composite image (LMH) is selected as an output image, and is output.

Next, the moving image shooting process of this embodiment will be described with reference to FIG. 6. When an instruction to start moving image shooting is input to the system control circuit 180 via a release button, a mode switching dial, or the like of the operation unit 190, a moving image shooting process is started. In the flowchart in FIG. 6, the processing in each step is realized by the system control circuit 180 executing a control program, unless otherwise described. Furthermore, in the flowchart in FIG. 6, the steps of performing processes that are the same as or similar to those in FIG. 2 are denoted by the same reference numerals, and a description thereof has been omitted.

In step S603, the system control circuit 180 shoots one frame under a low exposure condition equivalent to underexposure by 3/2 stops with respect to the proper exposure calculated in step S202, and stores the low-exposure image L in the memory 140. Subsequently, in step S604, the system control circuit 180 shoots one frame under a proper exposure condition, and stores the proper-exposure image M in the memory 140. Subsequently, in step S605, the system control circuit 180 shoots one frame under a high exposure condition equivalent to overexposure by 3/2 stops with respect to the proper exposure condition, and stores the high-exposure image H in the memory 140.

Next, the system control circuit 180 performs the processing in steps S606 to S610 referring to the image compositing control table as shown in FIG. 8 provided inside the system control circuit 180. Specifically, in step S606, the system control circuit 180 determines whether or not the zoom ratio is being changed. For this determination, the system control circuit 180 checks the optical zoom status flag FLG. If FLG=0 (i.e., if the zoom ratio is not being changed), the procedure advances to step S608. In step S608, the system control circuit 180 outputs a determination signal 1 and a determination signal 2 with the logic level Lo to the image processing circuit 130. As a result, the image processing circuit 130 causes the dynamic range expansion circuit 200 to composite the low-exposure image L, the proper-exposure image M, and the high-exposure image H stored in the memory 140, thereby generating an HDR composite image (LMH).

On the other hand, in step S606, if FLG=1 (i.e., if the zoom ratio is being changed), the procedure advances to step S607.

In step S607, the system control circuit 180 checks the zoom speed s. If s<s1 (i.e., if the speed of a change in the zoom ratio is less than the first threshold), the procedure advances to step S608. In this case, as in the case where FLG=0 in step S606, the image processing circuit 130 generates an HDR composite image (LMH).

On the other hand, in step S206, if s1≤s<s2, the procedure advances to step S609. In step S609, the system control circuit 180 outputs a determination signal 1 with the logic level Hi and a determination signal 2 with the logic level Lo to the image processing circuit 130. As a result, the image processing circuit 130 causes the dynamic range expansion circuit 200 to composite the low-exposure image L and the proper-exposure image M stored in the memory 140, thereby generating an HDR composite image (LM).

Furthermore, in step S607, if s≥s2, the procedure advances to step S610. In step S610, the system control circuit 180 outputs a determination signal 1 and a determination signal 2 with the logic level Hi to the image processing circuit 130. As a result, the image processing circuit 130 selects the proper-exposure image M instead of the HDR composite image.

After step S608, S609, or S610, in step S611, the image processing circuit 130 performs various types of image processing on the image obtained in step S608, S609, or S610, and outputs this image to the LCD 150 or the image conversion circuit 160. As necessary, the image processing circuit 130 also performs electronic zoom processing. In this manner, with the processing in steps S606 to S611, the HDR composite image (LMH), the HDR composite image (LM), or the proper-exposure image M is output as an image corresponding to one frame of a moving image based on the zoom operation state.

In this manner, until an end instruction is input in step S210, the system control circuit 180 repeats processing (image capture control) that captures a low-exposure image L, a proper-exposure image M, and a high-exposure image H in a predetermined period (in a period corresponding to one output synchronization signal in FIG. 7). Then, the image processing circuit 130 outputs the HDR composite image (LMH), the HDR composite image (LM), or the proper-exposure image M based on the zoom operation state.

Note that, as in the first embodiment, when the optical zoom status flag FLG is 1, the system control circuit 180 may output a determination signal 1 with the logic level Hi regardless of the zoom speed. In this case, in step S607, the first threshold s1 is not considered, and, if s<s2, the procedure advances to step S609. Furthermore, the system control circuit 180 may determine the determination signal based not on the optical zoom status flag but on a zoom status flag that does not distinguish the optical zoom from the electronic zoom. In this case, the system control circuit 180 considers a change in the zoom ratio in electronic zoom as well as that in optical zoom, and, if the zoom ratio is being changed, the procedure advances from step S606 to step S607.

Furthermore, in the flowchart in FIG. 6, it is assumed that the system control circuit 180 captures three images (a low-exposure image L, a proper-exposure image M, and a high-exposure image H) in a predetermined period, but the number of images to be captured is not limited to 3, and four or more images with different exposure amounts may be captured. In this case, the system control circuit 180 may use three or more thresholds in the determination in step S607, and output determination signals such that an HDR image is generated from a smaller number of images captured in a shorter period as the zoom speed is higher.

Furthermore, it is assumed that a proper-exposure image M is selected in step S610, but the image processing circuit 130 may select any other image captured in a predetermined period, as well as the proper-exposure image M. Furthermore, in step S609, the image processing circuit 130 may generate an HDR composite image (MH) instead of the HDR composite image (LM).

Furthermore, in this embodiment, for the sake of convenience of the description, it is assumed that the low exposure condition and the high exposure condition are respectively lower and higher than the proper exposure condition by (3/2) stops, but these conditions may be changed as appropriate.

As described above, according to this embodiment, the image capturing apparatus 100 outputs an HDR image if the zoom ratio is not being changed. Furthermore, if the zoom ratio is being changed, the image capturing apparatus 100 generates an HDR image from images that are fewer than the images to be used in the case where the zoom ratio is not being changed, and outputs the generated HDR image. As a result, the difference between the angles of view of images that are to be composited, which occurs due to a change in the zoom ratio, is reduced.

Accordingly, it is possible to suppress image blur in an image that is to be output, without limiting the zoom speed, when performing a zoom operation during moving image shooting with an image capturing apparatus while performing HDR image compositing.

Third Embodiment

In the first embodiment, the image capturing apparatus 100 outputs an ordinary image instead of the HDR image (i.e., does not generate an HDR image) if the zoom ratio is being changed. On the other hand, in the third embodiment, a configuration will be described in which, even when the zoom ratio is being changed, an HDR image is generated. In the third embodiment, the image capturing apparatus 100 has a basic configuration similar to that in the first embodiment (see FIG. 1), but is slightly different therefrom in terms of the moving image shooting process in the case where the zoom ratio is being changed. Hereinafter, mainly aspects different from those in the first embodiment will be described in detail.

In the moving image shooting process of this embodiment, the image capturing apparatus 100 switches the processing between inter-frame HDR processing and intra-frame HDR processing, based on the zoom state. The inter-frame HDR processing refers to processing that generates a plurality of images with different exposure amounts, by performing image capture a plurality of times with different exposure periods, and generates an HDR image from the obtained images. The intra-frame HDR processing refers to processing that generates a plurality of images with different exposure amounts, by performing image capture one time, and generates an HDR image from the obtained images. In the description below, it is assumed that, in the inter-frame HDR processing, the image capturing apparatus 100 generates an HDR image from two images with different exposure amounts, but an HDR image may be generated from three or more images.

Figure 11:
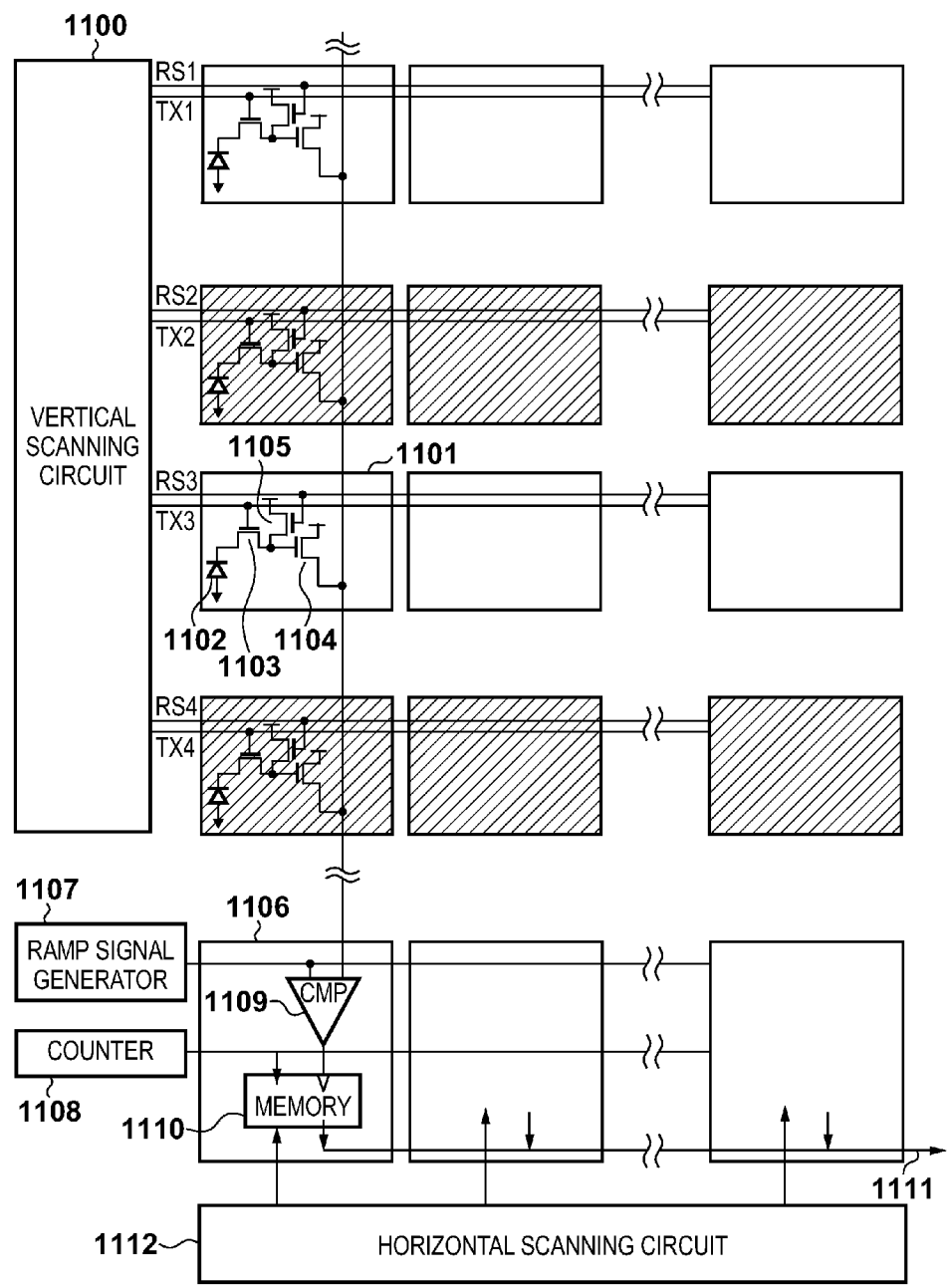
FIG. 11 is a diagram showing the internal configuration of the image sensor 120.

FIG. 11 is a diagram showing the internal configuration of the image sensor 120. In FIG. 11, reference numeral 1101 denotes a light-receiving pixel unit that receives light from the photographing lens 110, where light incident on a surface of the light-receiving pixel unit is photoelectrically converted and is output as an electrical signal. One unit of the light-receiving pixel unit 1101 is configured by a photodiode 1102, a transfer transistor 1103, a signal amplifier 1104, and a reset transistor 1105. The light-receiving pixel units 1101 are arranged in a two-dimensional array having a predetermined number of horizontal rows and a predetermined number of vertical columns.

The transfer transistor 1103 and the reset transistor 1105 operate in response to a signal from a vertical scanning circuit 1100 that is disposed in the image sensor 120. The vertical scanning circuit 1100 includes a shift register, a scan signal generation circuit that drives the transfer transistor 1103 of each pixel, and the like. Then, a generated scan signal (TX1 to TX4, RS1 to RS4, etc.) is used to control the transfer transistor 1103 and the reset transistor 1105, for example, such that electric charge in the photodiode 1102 is reset and read, and, thus, the exposure period can be controlled.

Reference numeral 1106 denotes a column A/D conversion unit, and is provided on the column basis in order to perform A/D conversion on the output from each pixel unit of the light-receiving pixel unit 1101. The column A/D conversion unit 1106 is configured by a comparator 1109 and a multi-bit memory 1110. Furthermore, a ramp signal generator 1107 and a counter 1108 that are shared by all vertical columns are provided. Then, the output from each light-receiving pixel unit 1101 and the output from the ramp signal generator 1107 are compared with each other by the comparator 1109, the time that elapses until the output of the comparator regarding the size order inverts is counted by the counter 1108, and, thus, the A/D conversion is performed. Then, the counted value is latched on the column basis in the memory 1110.

Reference numeral 1112 denotes a horizontal scanning circuit, and each column A/D conversion unit 1106 selects and reads a digital signal for the corresponding column according to a scan signal from the horizontal scanning circuit 1112, and, thus, a captured image output 1111 of the image sensor 120 is obtained.

Figure 12:
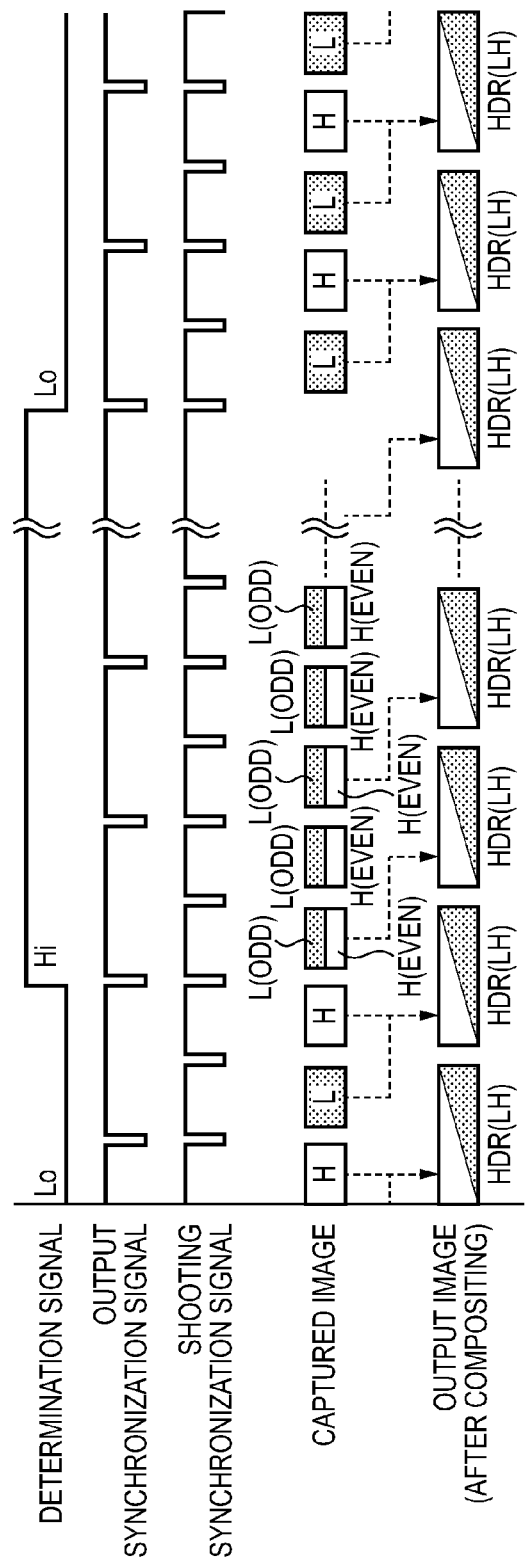
FIG. 12 is a timing chart schematically showing the overall operation of a moving image shooting process according to a third embodiment.
Figure 13A:
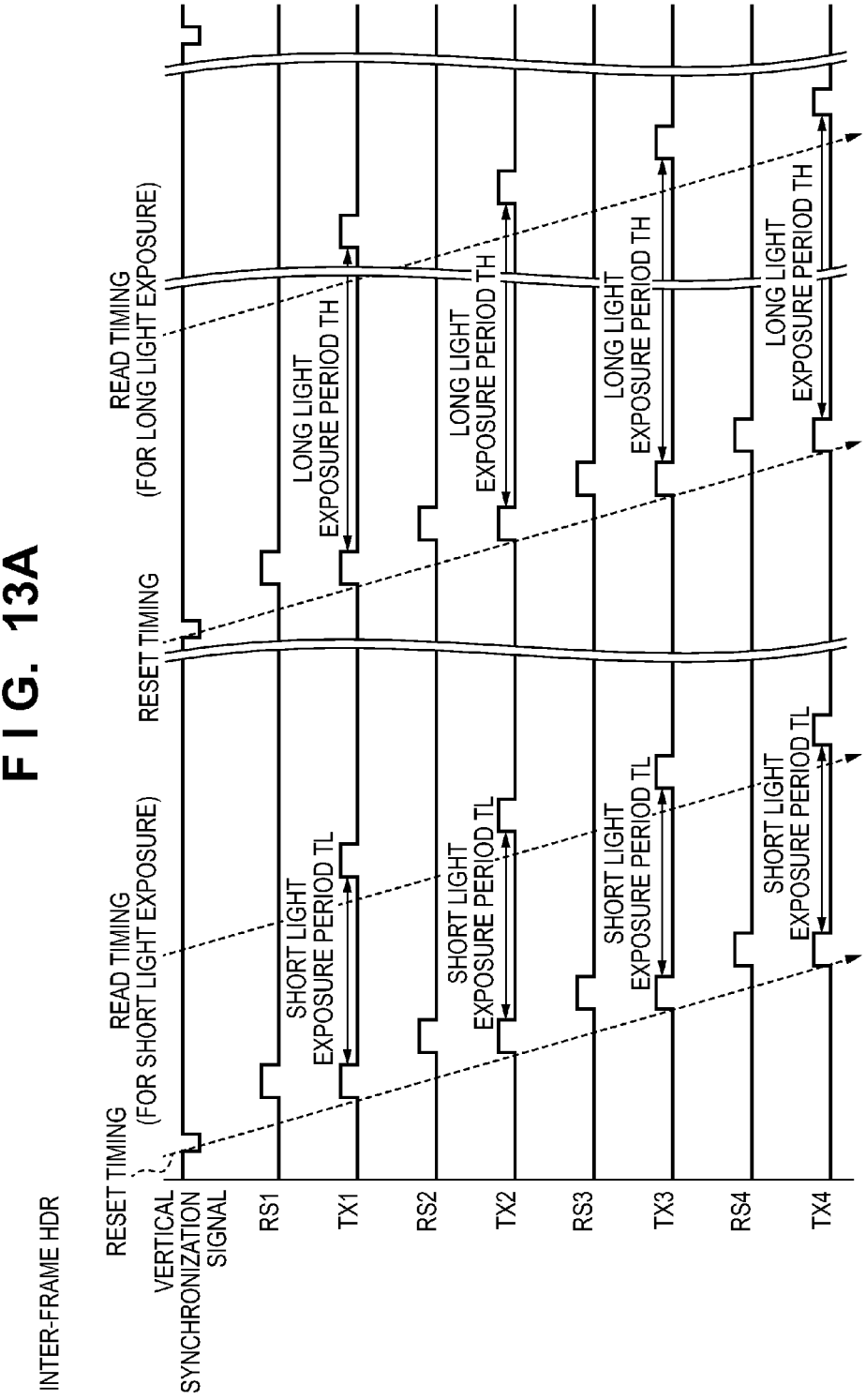
FIG. 13A is a timing chart of scan signals generated from a vertical scanning circuit 1100 during an inter-frame HDR operation.
Figure 14:
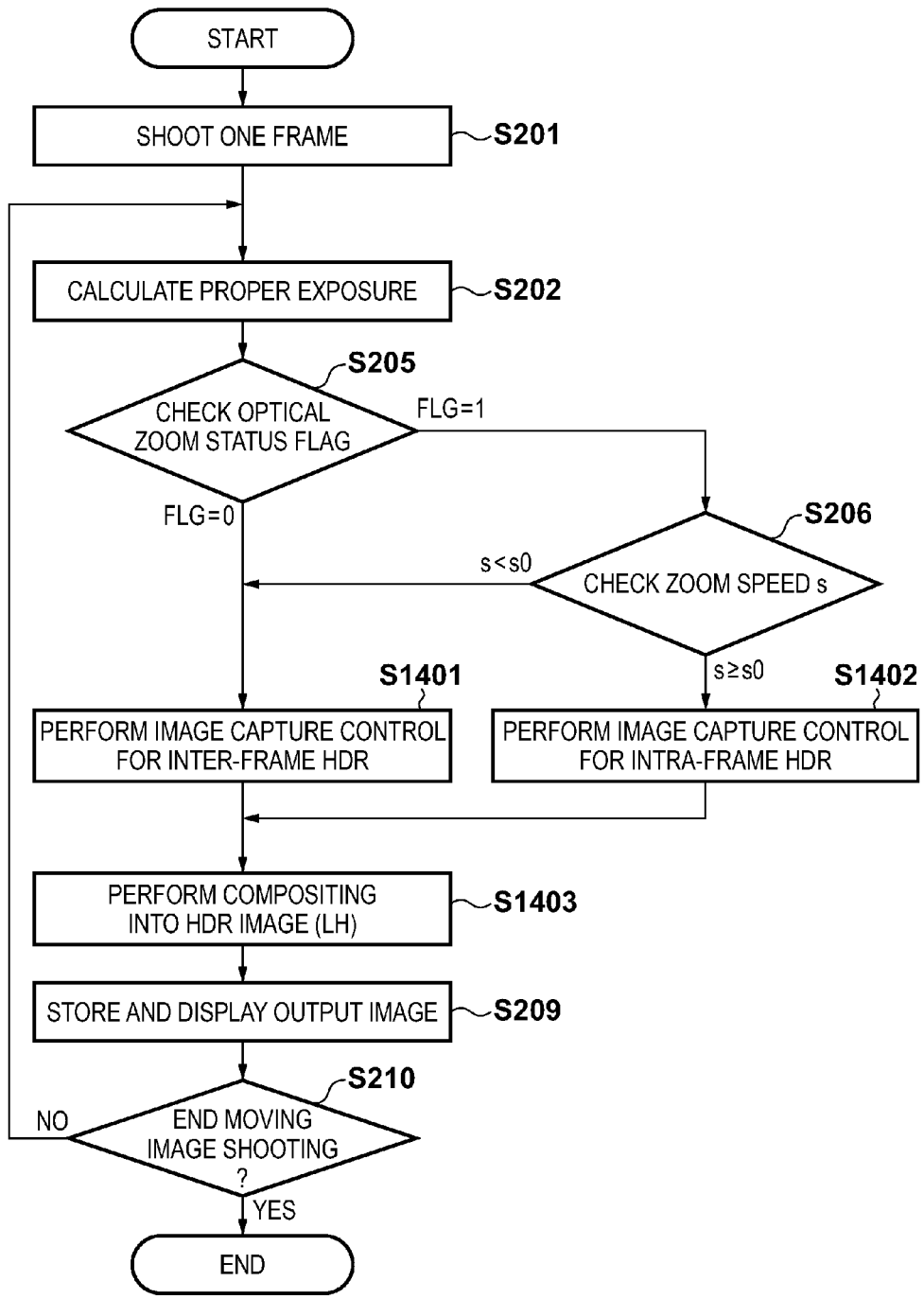
FIG. 14 is a flowchart showing a moving image shooting process according to the third embodiment.

Subsequently, a moving image shooting process according to the third embodiment will be described with reference to FIGS. 12 to 15. FIG. 12 is a timing chart schematically showing the overall operation of a moving image shooting process according to the third embodiment. FIGS. 13A and 13B are timing charts showing scan signals generated from the vertical scanning circuit 1100 when acquiring a low-exposure image and a high-exposure image in order to generate an HDR image in the third embodiment. FIG. 13A is a timing chart during an inter-frame HDR operation, and FIG. 13B is a timing chart during an intra-frame HDR operation. FIG. 14 is a flowchart showing a moving image shooting process according to the third embodiment. FIG. 15 is an image compositing control table defining branching in image compositing control based on an optical zoom status flag and a zoom speed value according to the third embodiment. First, FIGS. 12, 13A, 13B, and 15 will be individually described, after which the overall operation will be described with reference to the flowchart in FIG. 14.

FIG. 12 shows shot images and output images after compositing in the form of a conceptual diagram illustrating a time to shoot an image and a time to generate a composite image. In FIG. 12, low-exposure images are denoted by L, high-exposure images are denoted by H, and dynamic range expanded images after compositing obtained from these images are denoted by HDR (LH).

FIG. 12 is similar to FIG. 3 illustrating the first embodiment, but is different from FIG. 3 in terms of the operation performed in the case where the determination signal is Hi. In FIG. 12, if the determination signal is Hi, the intra-frame HDR processing is performed. That is to say, in the third embodiment, the inter-frame HDR processing and the intra-frame HDR processing are switched based on a determination signal from the system control circuit 180.

Accordingly, the image compositing control table (see FIG. 15) according to the third embodiment is different from that in the first embodiment (see FIG. 4) in terms of the "output image" row. Specifically, as shown in FIG. 15, if the determination signal is Lo, the output image is an inter-frame HDR composite image, and, if the determination signal is Hi, the output image is an intra-frame HDR composite image.

Next, timings during an inter-frame HDR operation will be described with reference to FIG. 13A. First, in a first frame period defined according to a vertical synchronization signal, exposure and reading of a low-exposure image L obtained through exposure for a short exposure period TL are performed.

When TX and RS signals rise, electric charge in the photodiodes 1102 is reset and the exposure is started. This operation is sequentially performed in a predetermined order from the light-receiving pixel units 1101 under the conditions set by the system control circuit 180.

First, RS1 to RS4 and TX1 to TX4 signals sequentially rise, and a row for a low-exposure image L is reset. Then, after the elapse of the short exposure period TL for the low-exposure image L, the TX1 to TX4 signals sequentially rise again, electric charge in the photodiodes 1102 is read by the signal amplifiers 1104 and is output through the horizontal scanning circuit 1112, and a next row signal for the low-exposure image L is acquired. Then, in a similar manner, the timings for the TX and RS signals in the subsequent rows are repeated until the last row in the frame period, and, thus, a low-exposure image L for one frame is acquired.

Then, when the first one frame period ends and a next frame period starts, exposure and reading of a high-exposure image H obtained through exposure for a long exposure period TH are performed. First, RS1 to RS4 and TX1 to TX4 sequentially rise, a row for a high-exposure image H is reset. Then, after the elapse of the long exposure period TH for the high-exposure image H, the TX1 to TX4 signals sequentially rise again, electric charge in the photodiodes 1102 is read by the signal amplifiers 1104 and is output through the horizontal scanning circuit 1112, and a next row signal for the high-exposure image H is acquired. Then, in a similar manner, the timings for the TX and RS signals in the subsequent rows are repeated until the last row in the frame period, and, thus, a high-exposure image H for one frame is acquired. Then, in a next frame period, exposure and reading of a low-exposure image L obtained through exposure for a short exposure period TL are performed again.

In this manner, in an inter-frame HDR operation, the timings are set such that a frame period for exposure and reading of a low-exposure image L and a frame period for exposure and reading of a high-exposure image H are alternately repeated on the frame basis.

Next, timings during an intra-frame HDR operation will be described with reference to FIG. 13B. The image sensor 120 in this embodiment can set each of exposure conditions for acquiring a low-exposure image L and for acquiring a high-exposure image H in the row cycle (on the row basis). This operation is sequentially performed in a predetermined order from the light-receiving pixel units 1101 under the conditions set by the system control circuit 180.

First, RS1, TX1, RS2, and TS2 rise, and rows for a low-exposure image L and for a high-exposure image H are reset. Then, after the elapse of the short exposure period TL for the low-exposure image L, TX1 rises again, electric charge in the photodiodes 1102 is read by the signal amplifiers 1104 and is output through the horizontal scanning circuit 1112, and a row signal for the low-exposure image L is acquired. Furthermore, after the elapse of the long exposure period TH for the high-exposure image H, the TX2 signal rises again, electric charge in the photodiodes 1102 is read by the signal amplifiers 1104 and is output through the horizontal scanning circuit 1112, and a row signal for the high-exposure image H is acquired.

Next, RS3, TX3, RS4, and TX4 rise, and rows for a low-exposure image L and for a high-exposure image H are reset. Then, after the elapse of the short exposure period TL for the low-exposure image L, TX3 rises again, electric charge in the photodiodes 1102 is read by the signal amplifiers 1104 and is output through the horizontal scanning circuit 1112, and a next row signal for the low-exposure image L is acquired. Furthermore, after the elapse of the long exposure period TH for the high-exposure image H, the TX4 signal rises again, electric charge in the photodiodes 1102 is read by the signal amplifiers 1104 and is output through the horizontal scanning circuit 1112, and a next row signal for the high-exposure image H is acquired.

Then, in a similar manner, the timings for the TX and RS signals in the subsequent rows are repeated until the last row in the frame period in order to perform exposure, reading, and acquisition of a row signal for the low-exposure image L and a row signal for the high-exposure image H, and, thus, a low-exposure image L and a high-exposure image H for one frame are acquired. Subsequently, the same frame operation is repeated on the frame basis.

In this manner, in an intra-frame HDR operation, the timings are set such that exposure, reading, and acquisition of a row signal for a low-exposure image L and a row signal for a high-exposure image H are alternately repeated on the row basis in one frame period, and the same frame operation is successively repeated.

Note that the setting for rows for a low-exposure image L and for a high-exposure image H during an intra-frame HDR operation is not limited to those described in FIG. 13B. Generally speaking, the image capturing apparatus 100 divides the light-receiving pixel units 1101 of the image sensor 120 into a plurality of groups (the number of groups also may be 3 or more), and performs image capture with exposure periods different on the group basis, thereby generating a plurality of images with different exposure amounts.

The method for generating an HDR image based on a low-exposure image L and a high-exposure image H in the third embodiment is similar to that in the case where the determination signal is Lo in the first embodiment (see FIG. 5). That is to say, in the third embodiment, methods for generating a low-exposure image L and a high-exposure image H vary depending on the determination signal, but, regardless of the determination signal, the output image is an HDR composite image (LH) shown in the upper right in FIG. 5.

Next, the moving image shooting process of this embodiment will be described with reference to FIG. 14. When an instruction to start moving image shooting is input to the system control circuit 180 via a release button, a mode switching dial, or the like of the operation unit 190, a moving image shooting process is started. In the flowchart in FIG. 14, the processing in each step is realized by the system control circuit 180 executing a control program, unless otherwise described. In FIG. 14, the steps of performing processes that are the same as or similar to those in FIG. 2 are denoted by the same reference numerals, and a description thereof has been omitted.

If the optical zoom status flag FLG is 0 in step S205, or if the optical zoom status flag FLG is 1 in step S205 and if the zoom speed s is smaller than s0 in step S206, the processing in step S1401 is performed. In step S1401, the system control circuit 180 performs image capture control (first control mode) throughout two frame periods according to the timings during an inter-frame HDR operation described with reference to FIG. 13A. Then, the system control circuit 180 stores the low-exposure image L acquired in the first one frame period and the high-exposure image H acquired in the next one frame period in the memory 140.

On the other hand, if the optical zoom status flag FLG is 1 in step S205 and the zoom speed s is s0 or more in step S206, the processing in step S1402 is performed. In step S1402, the system control circuit 180 performs image capture control (second control mode) throughout two frame periods according to the timings during an intra-frame HDR operation described with reference to FIG. 13B. Then, the system control circuit 180 stores the low-exposure image L and the high-exposure image H acquired in the first one frame period in the memory 140.

In step S1403, the image processing circuit 130 causes the dynamic range expansion circuit 200 to composite the low-exposure image L and the high-exposure image H stored in the memory 140, thereby generating an HDR composite image (LH).

Note that, as in the first embodiment, the low exposure condition and the high exposure condition may be respectively lower and higher than the proper exposure condition by 1 stop, but these conditions may be changed as appropriate. Furthermore, as in the first embodiment, the processing in step S206 in FIG. 14 may be omitted. Furthermore, as in the first embodiment, the system control circuit 180 may perform processing such that the procedure advances from step S205 to step S1401 also in the case where the zoom ratio is being changed with the electronic zoom, without distinguishing the optical zoom from the electronic zoom.

As described above, according to this embodiment, the image capturing apparatus 100 generates an HDR image with the inter-frame HDR processing if the zoom ratio is not being changed, and generates an HDR image with the intra-frame HDR processing if the zoom ratio is being changed. As a result, generation of an HDR image based on a plurality of images with different angles of view, due to a change in the zoom ratio, is suppressed.

Accordingly, it is possible to suppress image blur in an image that is to be output, without limiting the zoom speed, when performing a zoom operation during moving image shooting with an image capturing apparatus while performing HDR image compositing.

Fourth Embodiment

In the intra-frame HDR processing of the third embodiment, the image capturing apparatus 100 generates a low-exposure image and a high-exposure image by performing image capture one time while changing the exposure period of the image sensor 120 on the row basis. On the other hand, in the intra-frame HDR processing of the fourth embodiment, the image capturing apparatus 100 generates an image with its dynamic range being expanded, by providing each pixel of an image captured in one frame period with a gain characteristic that is different according to the level of each pixel signal. Hereinafter, the intra-frame HDR processing of the fourth embodiment will be described focusing on aspects different from those in the third embodiment.

FIG. 16 is a block diagram showing the configuration of a column A/D conversion unit 1601 of the image sensor 120 according to the fourth embodiment. In FIG. 16, constituent elements that are the same as or similar to those in FIG. 11 are denoted by the same reference numerals, and a description thereof has been omitted. The fourth embodiment is different from the third embodiment in that the image sensor 120 includes the column A/D conversion unit 1601 instead of the column A/D conversion unit 1106.

The column A/D conversion unit 1601 is provided on the column basis in order to perform A/D conversion on the output from each light-receiving pixel unit 1101. The column A/D conversion unit 1601 is configured by a first stage comparator 1602, a column amplifier 1603, an A/D comparator 1604, a multi-bit memory 1605, and a digital amplifier 1606.

Next, an operation of the column A/D conversion unit 1601 will be described. The output from each light-receiving pixel unit 1101 is transmitted via a vertical signal line that is shared on the column basis, is input to the column A/D conversion unit 1601, and is divided into two. One of the divided portions is supplied to the first stage comparator 1602 and is compared with a reference voltage VREF, and the other portion is supplied to the column amplifier 1603 and is provided with a desired gain characteristic.

The output from the first stage comparator 1602 is held for one horizontal scanning period, and is supplied as a gain control signal to the column amplifier 1603. Accordingly, the gain characteristic of the column amplifier 1603 is switched between one time and four times based on the output level from each light-receiving pixel unit 1101.

The output from the column amplifier 1603 and the output from the ramp signal generator 1107 are compared with each other by the A/D comparator 1604, the time that elapses until the output of the comparator regarding the size order inverts is counted by the counter 1108, and, thus, the A/D conversion is performed. Then, the counted value is latched on the column basis in the memory 1605.

Furthermore, the output from the memory 1605 is supplied to the digital amplifier 1606 and is provided with a desired gain characteristic. Furthermore, the output from the first stage comparator 1602 is supplied as a gain control signal to the digital amplifier 1606. Accordingly, the gain characteristic of the digital amplifier 1606 is switched between one time and four times based on the output level from each light-receiving pixel unit 1101.

The column A/D conversion unit 1601 selects and reads a digital signal for the corresponding column according to a scan signal from the horizontal scanning circuit 1112, and, thus, the captured image output 1111 of the image sensor 120 is obtained.

FIGS. 17A to 17F are diagrams schematically illustrating the intra-frame HDR processing according to the fourth embodiment. FIGS. 17A to 17F show exemplary relationships between input and output ranges of shooting signals respectively for a low-level pixel signal and a high-level pixel signal from which an HDR image is generated.

FIG. 17A shows the pixel signal output from the light-receiving pixel unit 1101, FIG. 17B shows the column amplifier output when the gain is amplified by one time, and FIG. 17C shows the column amplifier output when the gain is amplified by four times. Furthermore, FIG. 17D shows the A/D conversion output when the gain is to be amplified by one time, FIG. 17E shows the A/D conversion output when the gain is to be amplified by four times, and FIG. 17F shows an HDR image. Hereinafter, the manner in which the dynamic range of an image capture signal is expanded in an image within one frame will be described with reference to FIGS. 17A to 17F.

The reference voltage VREF set in the first stage comparator 1602 is set at exactly ¼ the output full range of the pixel signal output. In pixel signal output G, pixel signal output exceeding ¼ the output full range forms the column amplifier output when the gain is amplified by one time shown in FIG. 17B. Meanwhile, in the pixel signal output G, pixel signal output not exceeding ¼ the output full range forms the column amplifier output when the gain is amplified by four times shown in FIG. 17C. In other words, the system control circuit 180 causes the image sensor 120 to generate an analog image signal through exposure for a predetermined period. Then, the system control circuit 180 performs control (second control mode) on the analog image signal such that a pixel having a signal level of less than a threshold is multiplied by a gain (four times) larger than that for a pixel having a signal level of the threshold or more. Accordingly, the sensitivity for a low-luminance region is improved, and an image with an expanded dynamic range is finally obtained.

Then, the column amplifier output when the gain is amplified by one time is subjected to A/D conversion at a 10-bit precision to the A/D conversion output shown in FIG. 17D, and a tone range of ¼ the full range to the full range (256 to 1024 tones) is obtained. Furthermore, the A/D conversion output when the gain is amplified by one time is provided with a gain amplified by four times at the digital amplifier 1606, and a tone range of the full range to four times the full range (1024 to 4096 tones) is obtained.

Meanwhile, the column amplifier output when the gain is amplified by four times is subjected to A/D conversion at a 10-bit precision to the A/D conversion output shown in FIG. 17E, and a tone range of 0 to the full range (0 to 1023 tones) is obtained. Furthermore, the A/D conversion output when the gain is amplified by four times is provided with a gain amplified by one time at the digital amplifier 1606, and the tone range is kept at 0 to the full range (0 to 1023 tones).

Then, the A/D conversion output shown in FIG. 17D and the A/D conversion output shown in FIG. 17E, divided along the tone range 1024 as the boundary, are composited. Accordingly, in the output image after compositing shown in FIG. 17F, it is possible to obtain the tone range (4096) that is four times the 10-bit full range (1024).

In the region over ¼ the output full range of a pixel signal, the tone precision and the digital noise will naturally deteriorate by four times due to the gain up by four times at the digital amplifier. However, in the high-luminance region, such gain up by four times or so usually does not cause any problem because the signal level is suppressed by the gamma processing performed by the image processing circuit 130. That is to say, the processing in FIGS. 17A to 17F shows the fact that, in a digital region, it is possible to expand the signal dynamic range by four times while maintaining the linearity of the pixel signal using ¼ the output full range of the pixel signal as the boundary.

In this manner, according to the intra-frame HDR processing of the fourth embodiment, the exposure condition does not have to be changed on the row basis contrary to the case of the third embodiment. Thus, as in the inter-frame HDR processing, all pixel signals within a frame can be subjected to more uniform HDR processing.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording media of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-131387, filed Jun. 8, 2012 and 2013-035155, filed Feb. 25, 2013, which are hereby incorporated by reference herein in their entirety.

What is claimed is:

1. An image capturing apparatus, comprising;
   an image capturing unit configured to capture an image of a subject;
   a zoom control unit configured to control a zoom ratio during shooting;
   an image capture control unit configured to control the image capturing unit such that a plurality of images with different exposure conditions are captured in a predetermined period;
   a generation output unit configured to generate a composite image from the plurality of images and output the generated composite image; and
   a determination unit configured to determine whether or not the zoom ratio is being changed during the predetermined period;

wherein, in a case where it is determined that the zoom ratio is being changed, the generation output unit outputs one of the images captured by the image capturing unit during the predetermined period, instead of the composite image, wherein the zoom control unit can change the zoom ratio with at least one of optical zoom and electronic zoom, and in the determination, the determination unit determines that the zoom ratio is not being changed in a case of a change in the zoom ratio with the electronic zoom.

2. The image capturing apparatus according to claim 1, wherein, even when it is determined that the zoom ratio is being changed, in a case where a speed of the change is lower than a first threshold, the generation output unit generates a composite image from the plurality of images and outputs the generated composite image.

3. An image capturing apparatus, comprising:
an image capturing unit configured to capture an image of a subject;
a zoom control unit configured to control a zoom ratio of the image captured by the image capturing unit;
an image capture control unit configured to control the image capturing unit such that a plurality of images with different exposure amounts are generated, by operating either in a first control mode in which the image capturing unit is caused to perform image capture a plurality of times with different exposure periods, so that the plurality of images are generated, or in a second control mode in which pixels of the image capturing unit are divided into a plurality of groups, and the image capturing unit is caused to perform image capture with exposure periods different on a group basis, so that the plurality of images are generated;
a generation output unit configured to generate a composite image from the plurality of images and output the generated composite image; and
a determination unit configured to determine whether or not the zoom ratio is being changed;
wherein, in a case where it is determined that the zoom ratio is being changed, the image capture control unit operates in the second control mode.

4. The image capturing apparatus according to claim 3, wherein, even when it is determined that the zoom ratio is being changed, in a case where a speed of the change is lower than a first threshold, the image capture control unit operates in the first control mode.

5. The image capturing apparatus according to claim 3, wherein the zoom control unit can change the zoom ratio with at least one of optical zoom and electronic zoom, and in the determination, the determination unit determines that the zoom ratio is not being changed in a case of a change in the zoom ratio with the electronic zoom.

6. A method for controlling an image capturing apparatus including an image capturing unit configured to capture an image of a subject, comprising:

a zoom control step of controlling a zoom ratio during shooting;
an image capture control step of controlling the image capturing unit such that a plurality of images with different exposure conditions are captured in a predetermined period;
a generation output step of generating a composite image from the plurality of images and outputting the generated composite image; and
a determination step of determining whether or not the zoom ratio is being changed during the predetermined period;
wherein, in a case where it is determined that the zoom ratio is being changed, in the generation output step, one of the images captured by the image capturing unit during the predetermined period is output instead of the composite image,
wherein the zoom control step can change the zoom ratio with at least one of optical zoom and electronic zoom, and
in the determination, the determination step determines that the zoom ratio is not being changed in a case of a change in the zoom ratio with the electronic zoom.

7. A method for controlling an image capturing apparatus including an image capturing unit configured to capture an image of a subject, comprising:
a zoom control step of controlling a zoom ratio of the image captured by the image capturing unit;
an image capture control step of controlling the image capturing unit such that a plurality of images with different exposure amounts are generated, by operating either in a first control mode in which the image capturing unit is caused to perform image capture a plurality of times with different exposure periods, so that the plurality of images are generated, or in a second control mode in which pixels of the image capturing unit are divided into a plurality of groups, and the image capturing unit is caused to perform image capture with exposure periods different on a group basis, so that the plurality of images are generated;
a generation output step of generating a composite image from the plurality of images and outputting the generated composite image; and
a determination step of determining whether or not the zoom ratio is being changed;
wherein, in a case where it is determined that the zoom ratio is being changed, the operation in the image capture control step is performed in the second control mode.

8. A non-transitory computer-readable storage medium storing a program which causes a computer to execute the control method according to claim 6.

9. A non-transitory computer-readable storage medium storing a program which causes a computer to execute the control method according to claim 7.

* * * * *